United States Patent
Mitani et al.

(10) Patent No.: US 10,776,901 B2
(45) Date of Patent: Sep. 15, 2020

(54) PROCESSING DEVICE, PROCESSING METHOD, AND NON-TRANSITORY COMPUTER-READABLE MEDIUM PROGRAM WITH OUTPUT IMAGE BASED ON PLURALITY OF PREDETERMINED POLARIZATION DIRECTIONS AND PLURALITY OF PREDETERMINED WAVELENGTH BANDS

(71) Applicant: Sony Corporation, Tokyo (JP)

(72) Inventors: Hitoshi Mitani, Kanagawa (JP); Masafumi Wakazono, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/301,971

(22) PCT Filed: Aug. 3, 2017

(86) PCT No.: PCT/JP2017/028288
§ 371 (c)(1),
(2) Date: Nov. 15, 2018

(87) PCT Pub. No.: WO2018/034165
PCT Pub. Date: Feb. 22, 2018

(65) Prior Publication Data
US 2019/0188827 A1 Jun. 20, 2019

(30) Foreign Application Priority Data

Aug. 17, 2016 (JP) .................. 2016-159853

(51) Int. Cl.
H04N 5/225 (2006.01)
G06T 3/40 (2006.01)
(Continued)

(52) U.S. Cl.
CPC .............. *G06T 3/4038* (2013.01); *G06T 5/40* (2013.01); *G06T 7/33* (2017.01); *H04N 5/23229* (2013.01);
(Continued)

(58) Field of Classification Search
CPC .................................................. G06T 3/4038
See application file for complete search history.

(56) References Cited

U.S. PATENT DOCUMENTS 5,790,188 A    8/1998  Sun
6,772,003 B2 * 8/2004  Kaneko .............. A61B 1/00096
                                              600/476
(Continued)

FOREIGN PATENT DOCUMENTS

CN    105785395 A    7/2016
CN    105830364 A    8/2016
(Continued)

OTHER PUBLICATIONS

Japanese Office Action dated Jan. 30, 2020 for corresponding Japanese Application No. 2016-159853.
Chinese Office Action dated Jun. 18, 2020 for corresponding Chinese Application No. 2017800048126.8.

*Primary Examiner* — Gary C Vieaux
(74) *Attorney, Agent, or Firm* — Michael Best Friedrich LLP

(57) ABSTRACT

The present disclosure includes a processing device, a method, and a non-transitory computer-readable medium. The processing device includes circuitry configured to acquire a plurality of images captured in a time series by an image sensor, each of the plurality of images is based on light in one of a plurality of predetermined polarization directions and in one of a plurality of predetermined wavelength bands. The circuitry is further configured to stitch together at least a part of the plurality of images correspond- (Continued)

ing to a single polarization direction and a single predetermined wavelength band from the plurality of predetermined wavelength bands to generate a composite image.

20 Claims, 18 Drawing Sheets

(51) Int. Cl.
  *H04N 5/232* (2006.01)
  *H04N 9/04* (2006.01)
  *G06T 7/33* (2017.01)
  *G06T 5/40* (2006.01)
(52) U.S. Cl.
  CPC ..... *H04N 5/23232* (2013.01); *H04N 5/23238* (2013.01); *H04N 9/045* (2013.01); *G06T 2207/10024* (2013.01); *G06T 2207/10048* (2013.01); *G06T 2207/10152* (2013.01); *G06T 2207/20021* (2013.01); *G06T 2207/20221* (2013.01)

(56) References Cited

U.S. PATENT DOCUMENTS

| | | | |
|---|---|---|---|
| 7,557,918 | B1 | 7/2009 | Newman et al. |
| 2009/0046909 | A1* | 2/2009 | Rutenberg ............... G06T 5/30 |
| | | | 382/128 |
| 2010/0046853 | A1 | 2/2010 | Goodnough et al. |
| 2010/0102211 | A1* | 4/2010 | Murooka ................. H04N 9/07 |
| | | | 250/226 |
| 2014/0118502 | A1* | 5/2014 | Jang .................... G01B 11/2509 |
| | | | 348/46 |
| 2016/0006954 | A1* | 1/2016 | Robertson .............. H04N 5/332 |
| | | | 348/144 |

FOREIGN PATENT DOCUMENTS

| | | |
|---|---|---|
| JP | 2009-139356 A | 6/2009 |
| JP | 4932978 B1 | 2/2012 |
| JP | 2016-127365 A | 7/2016 |
| WO | 2008/149489 A1 | 12/2008 |
| WO | 2015/169875 A1 | 11/2015 |

* cited by examiner

*FIG. 8*

|   | R |   |   |   | G |   |   |
|---|---|---|---|---|---|---|---|
| 135 | 0 | 135 | 0 | 135 | 0 | 135 | 0 |
| 90 | 45 | 90 | 45 | 90 | 45 | 90 | 45 |
| 135 | 0 | 135 | 0 | 135 | 0 | 135 | 0 |
| 90 | 45 | 90 | 45 | 90 | 45 | 90 | 45 |
| 135 | 0 | 135 | 0 | 135 | 0 | 135 | 0 |
| 90 | 45 | 90 | 45 | 90 | 45 | 90 | 45 |
| 135 | 0 | 135 | 0 | 135 | 0 | 135 | 0 |
| 90 | 45 | 90 | 45 | 90 | 45 | 90 | 45 |
|   | B |   |   |   | IR |   |   |

FIG. 9

| 135 | 0 | 135 | 0 | 135 | 0 | 135 | 0 | 135 | 0 | 135 | 0 | 135 | 0 | 135 | 0 |
|---|---|---|---|---|---|---|---|---|---|---|---|---|---|---|---|
| 90 | 45 | 90 | 45 | 90 | 45 | 90 | 45 | 90 | 45 | 90 | 45 | 90 | 45 | 90 | 45 |
| 135 | 0 | 135 | 0 | 135 | 0 | 135 | 0 | 135 | 0 | 135 | 0 | 135 | 0 | 135 | 0 |
| 90 | 45 | 90 | 45 | 90 | 45 | 90 | 45 | 90 | 45 | 90 | 45 | 90 | 45 | 90 | 45 |
| 135 | 0 | 135 | 0 | 135 | 0 | 135 | 0 | 135 | 0 | 135 | 0 | 135 | 0 | 135 | 0 |
| 90 | 45 | 90 | 45 | 90 | 45 | 90 | 45 | 90 | 45 | 90 | 45 | 90 | 45 | 90 | 45 |
| 135 | 0 | 135 | 0 | 135 | 0 | 135 | 0 | 135 | 0 | 135 | 0 | 135 | 0 | 135 | 0 |
| 90 | 45 | 90 | 45 | 90 | 45 | 90 | 45 | 90 | 45 | 90 | 45 | 90 | 45 | 90 | 45 |
| 135 | 0 | 135 | 0 | 135 | 0 | 135 | 0 | 135 | 0 | 135 | 0 | 135 | 0 | 135 | 0 |
| 90 | 45 | 90 | 45 | 90 | 45 | 90 | 45 | 90 | 45 | 90 | 45 | 90 | 45 | 90 | 45 |
| 135 | 0 | 135 | 0 | 135 | 0 | 135 | 0 | 135 | 0 | 135 | 0 | 135 | 0 | 135 | 0 |
| 90 | 45 | 90 | 45 | 90 | 45 | 90 | 45 | 90 | 45 | 90 | 45 | 90 | 45 | 90 | 45 |
| 135 | 0 | 135 | 0 | 135 | 0 | 135 | 0 | 135 | 0 | 135 | 0 | 135 | 0 | 135 | 0 |
| 90 | 45 | 90 | 45 | 90 | 45 | 90 | 45 | 90 | 45 | 90 | 45 | 90 | 45 | 90 | 45 |
| 135 | 0 | 135 | 0 | 135 | 0 | 135 | 0 | 135 | 0 | 135 | 0 | 135 | 0 | 135 | 0 |
| 90 | 45 | 90 | 45 | 90 | 45 | 90 | 45 | 90 | 45 | 90 | 45 | 90 | 45 | 90 | 45 |
| R | | | | G | | | | B | | | | IR | | | |

| 0 | 45 | 0 | 45 | 0 | 45 | 0 | 45 | ⎫ |
|---|---|---|---|---|---|---|---|---|
| 135 | 90 | 135 | 90 | 135 | 90 | 135 | 90 | |
| 0 | 45 | 0 | 45 | 0 | 45 | 0 | 45 | ⎬ IR |
| 135 | 90 | 135 | 90 | 135 | 90 | 135 | 90 | ⎭ |
| 0 | 45 | 0 | 45 | 0 | 45 | 0 | 45 | ⎫ |
| 135 | 90 | 135 | 90 | 135 | 90 | 135 | 90 | |
| 0 | 45 | 0 | 45 | 0 | 45 | 0 | 45 | ⎬ B |
| 135 | 90 | 135 | 90 | 135 | 90 | 135 | 90 | ⎭ |
| 0 | 45 | 0 | 45 | 0 | 45 | 0 | 45 | ⎫ |
| 135 | 90 | 135 | 90 | 135 | 90 | 135 | 90 | |
| 0 | 45 | 0 | 45 | 0 | 45 | 0 | 45 | ⎬ G |
| 135 | 90 | 135 | 90 | 135 | 90 | 135 | 90 | ⎭ |
| 0 | 45 | 0 | 45 | 0 | 45 | 0 | 45 | ⎫ |
| 135 | 90 | 135 | 90 | 135 | 90 | 135 | 90 | |
| 0 | 45 | 0 | 45 | 0 | 45 | 0 | 45 | ⎬ R |
| 135 | 90 | 135 | 90 | 135 | 90 | 135 | 90 | ⎭ |
|  |  |  |  |  |  |  |  | ⎫ |
|  |  |  |  |  |  |  |  | ⎬ NON-POLARIZATION/ |
|  |  |  |  |  |  |  |  | WHITE COLOR |
|  |  |  |  |  |  |  |  | ⎭ |

PROCESSING DEVICE, PROCESSING METHOD, AND NON-TRANSITORY COMPUTER-READABLE MEDIUM PROGRAM WITH OUTPUT IMAGE BASED ON PLURALITY OF PREDETERMINED POLARIZATION DIRECTIONS AND PLURALITY OF PREDETERMINED WAVELENGTH BANDS

CROSS REFERENCE TO RELATED APPLICATIONS

This application claims the benefit of Japanese Priority Patent Application JP 2016-159853 filed on Aug. 17, 2016, the entire contents of which are incorporated herein by reference.

TECHNICAL FIELD

The present disclosure relates to a signal processing device, a signal processing method, and a program, and particularly relates to a signal processing device, a signal processing method, and a program, capable of preferably performing desired inspection.

BACKGROUND ART

The normalized difference vegetation index (NDVI) is conventionally used as an indicator that indicates the distribution state and the activity of plants.

For example, the raising state of a crop is inspected with an image acquired by capturing an object to be inspected with dispersion with the components of near-infrared light and red light, for a purpose in the fields of remote sensing and precision agriculture. In addition, using a polarization imager including various polarization filters arranged for each pixel, can acquire an image having a characteristic corresponding to a polarization direction. Note that, the polarization imager separates the pixels in a light-receiving surface, into a plurality of polarization directions and then generates an image for each polarization direction so that resolution degrades (in a case where four polarization directions are used, for example, the resolution degrades to be ¼).

For example, PTL 1 discloses the following image capturing device. An actuator shifts, per pixel unit, a polarizer array including polarizers (a polarization filter for each pixel) arranged in an array form so that a plurality of images is captured and then is processed to retain resolution.

CITATION LIST

Patent Literature

[PTL 1]
JP 4932978 B1

SUMMARY

Technical Problem

A method of acquiring an image having a wide range with high resolution by stitching a plurality of images that has been consecutively captured, being moved, has been generally known (referred to as image stitching). However, the method of acquiring the image having the wide range by stitching the plurality of images and the method of retaining the resolution by using the image capturing device disclosed in PTL 1 above are difficult to make compatible with each other. Therefore, for example, there is a need to preferably perform inspection of vegetation with the normalized difference vegetation index by acquiring an image having a wide range with high resolution even when the polarization imager is used.

The present disclosure has been made in consideration of the above situation, and is to allow desired inspection to be preferably performed.

Solution to Problem

A signal processing device according to one aspect of the present disclosure includes: a feature point detection unit configured to detect a feature point from an image included in each detection area, on the basis of output of a detection unit including the plurality of detection areas for wavelength bands, the detection areas each including a plurality of sensor elements that detects light in the same wavelength band and includes adjacent sensor elements that mutually detect the light in different polarization directions; and an image processing unit configured to stitch the image in each of the detection areas on the basis of the feature point that has been detected, so as to construct an image larger than one image acquired by the detection unit.

A signal processing method and a program according to one aspect of the present disclosure include: detecting a feature point from an image included in each detection area on the basis of output of a detection unit including the plurality of detection areas for wavelength bands, the detection areas each including a plurality of sensor elements that detects light in the same wavelength band and includes adjacent sensor elements that mutually detect the light in different polarization directions; and stitching the image in each of the detection areas on the basis of the feature point that has been detected, so as to construct an image larger than one image acquired by the detection unit.

According to one aspect of the present disclosure, a feature point is detected from an image included in each detection area, on the basis of output of a detection unit including the plurality of detection areas for wavelength bands, the detection areas each including a plurality of sensor elements that detects light in the same wavelength band and includes adjacent sensor elements that mutually detect the light in different polarization directions; and the image is stitched in each of the detection areas on the basis of the feature point that has been detected so that an image larger than one image acquired by the detection unit is constructed.

According to another aspect of the present disclosure, a processing device including circuitry configured to acquire a plurality of images captured in a time series by an image sensor, each of the plurality of images is based on light in one of a plurality of predetermined polarization directions and in one of a plurality of predetermined wavelength bands. The circuitry is further configured to stitch together at least a part of the plurality of images corresponding to a single polarization direction and a single predetermined wavelength band from the plurality of predetermined wavelength bands to generate a composite image.

According to another aspect of the present disclosure, a method that includes acquiring, with a circuitry, a plurality of images captured in a time series by an image sensor, each of the plurality of images is based on light in one of a plurality of predetermined polarization directions and in one of a plurality of predetermined wavelength bands. The method further includes stitching together, with the circuitry, at least a part of the plurality of images corresponding to a single polarization direction and a single predetermined wavelength band from the plurality of predetermined wavelength bands to generate a composite image.

According to yet another aspect of the present disclosure, a non-transitory computer-readable medium storing a program for causing an electronic processor to execute a set of operations, the set of operations includes acquiring a plurality of images captured in a time series by an image sensor, each of the plurality of images is based on light in one of a plurality of predetermined polarization directions and in one of a plurality of predetermined wavelength bands. The set of operations further includes stitching together at least a part of the plurality of images corresponding to a single polarization direction and a single predetermined wavelength band from the plurality of predetermined wavelength bands to generate a composite image.

Advantageous Effects of Invention

According to one aspect of the present disclosure, desired inspection can be preferably performed.

BRIEF DESCRIPTION OF DRAWINGS

FIG. 8 is a view of an exemplary pixel arrangement in accordance with a different arrangement regulation of the minimum detection area.

FIG. 9 is a view of a first modification of the pixel arrangement in the detection device.

FIG. 10 is a view of a second modification of the pixel arrangement in the detection device.

FIG. 11 is a view of a third modification of the pixel arrangement in the detection device.

DESCRIPTION OF EMBODIMENTS

Specific embodiments to which the present technology has been applied, will be described in detail below with reference to the drawings.

<Embodiment of Vegetation Inspection Device>

Figure 1:
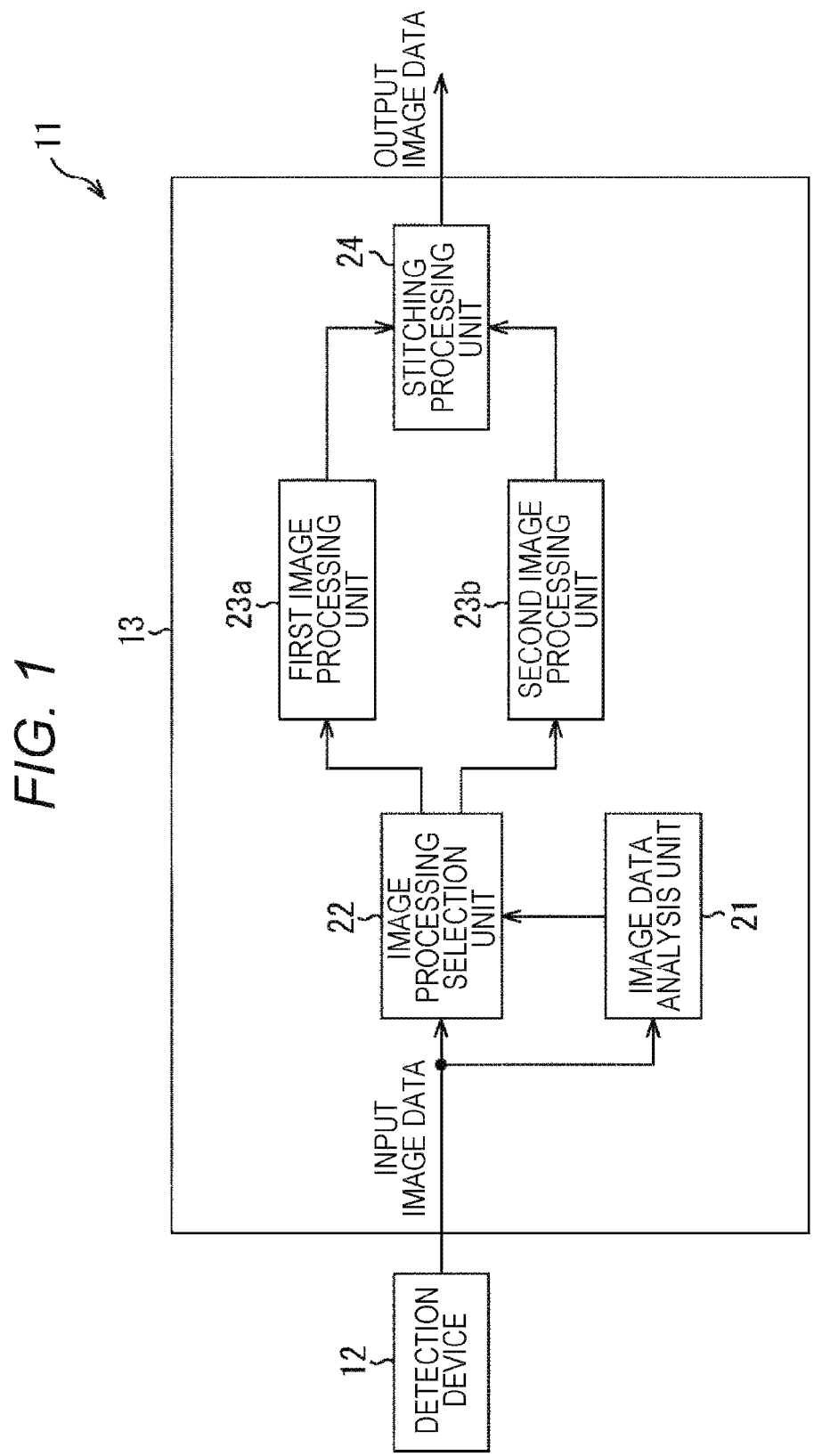
FIG. 1 is a block diagram of an exemplary configuration of one embodiment of a vegetation inspection device to which the present technology has been applied.

FIG. 1 is a block diagram of an exemplary configuration of one embodiment of a vegetation inspection device to which the present technology has been applied.

As illustrated in FIG. 1, the vegetation inspection device 11 includes a detection device 12 and a signal processing device 13, and is used to inspect a raising state, such as the vegetation state or the activity of an object to be inspected, such as grass or a crop.

The detection device 12 is, for example, an image sensor including a plurality of pixels (sensor elements) arranged in a matrix form on a light-receiving surface, and detects, for each pixel, the intensity of light reflected from a surface of the object to be inspected so that an image of the object to be inspected can be acquired. In addition, the detection device 12 includes each pixel that detects the light in a polarization direction and in a specific wavelength band. For example, the detection device 12 includes a polarization filter that transmits the light in a predetermined polarization direction and an optical filter that transmits the light in a predetermined wavelength band, layered to a sensor substrate including photodiodes formed, the photodiodes included in the pixels.

Figure 2:
FIG. 2 is a view of an exemplary pixel arrangement in a detection device.

For example, as illustrated in FIG. 2, the pixels each that detect the light in a different polarization direction, are arranged to be adjacent to each other in the detection device 12. That is, each small square illustrated in FIG. 2 represents a pixel, and a numeral added to each pixel represents the angle of a polarization direction. In the example illustrated in FIG. 2, a polarization direction is set every 45°, and four pixels including polarization directions set at 0°, 45°, 90°, and 135° are arranged to be adjacent to each other in a 2×2 matrix form. In addition, the detection device 12 includes the four pixels as a set and the pixels are arranged for each set. Note that, the detection device 12 is not limited to the detection of the light in the four polarization directions, and at least detects the light in at least three polarization directions with three pixels arranged to be adjacent to each other.

In addition, for example, the detection device 12 includes pixels that detect the light in the same wavelength band, integrally arranged for each detection area of wavelength bands. That is, as illustrated in FIG. 2, the detection device 12 includes pixels that detect the light in a red wavelength band, arranged in a red detection area R, pixels that detect the light in a green wavelength band, arranged in a green detection area G, pixels that detect the light in a blue wavelength band, arranged in a blue detection area B, and pixels that detect the light in a near-infrared wavelength band, arranged in a near-infrared detection area IR.

The red detection area R, the green detection area G, the blue detection area B, and the near-infrared detection area IR are formed to have an elongate and rectangular shape in a column direction (an upper and lower direction of FIG. 2), and the areas are arranged in parallel in a row direction (a left and right direction of FIG. 2). In this manner, the detection device 12 includes the light-receiving surface including the plurality of pixels arranged, divided into four sections including the red detection area R, the green detection area G, the blue detection area B, and the near-infrared detection area IR. Therefore, the detection device 12 can acquire an image for each wavelength band, divided to have the elongate and rectangular shape in the column direction (hereinafter, appropriately referred to as a divided image) through each of the red detection area R, the green detection area G, the blue detection area B, and the near-infrared detection area IR, by one time of exposure.

Here, while the vegetation inspection device 11 is relatively moving to the object to be inspected, the detection device 12 can consecutively acquire a plurality of images at a high speed, and the plurality of images is used for inspection of the object to be inspected. In this case, the row direction of FIG. 2 is defined as a moving direction of the detection device 12 in order to allow the red detection area R, the green detection area G, the blue detection area B, and the near-infrared detection area IR to sequentially scan the object to be inspected. In addition, the vegetation inspection device 11 moves, for example, at a moving speed to superimpose divided images consecutively acquired through each of the red detection area R, the green detection area G, the blue detection area B, and the near-infrared detection area IR, by a predetermined width or more in the row direction, in inspecting the object to be inspected.

In this manner, the detection device 12 detects the light in the four polarization directions with the pixels, and can acquire the divided images in each wavelength band of the red detection area R, the green detection area G, the blue detection area B, and the near-infrared detection area IR. Then, the detection device 12 inputs, as input image data, image data including a pixel value in response to the intensity of the light in each polarization direction in each wavelength band, into the signal processing device 13.

The signal processing device 13 includes, as illustrated in FIG. 1, an image data analysis unit 21, an image processing selection unit 22, a first image processing unit 23a, a second image processing unit 23b, and a stitching processing unit 24.

The image data analysis unit 21 performs analysis to the input image data input from the detection device 12, and supplies an analysis result thereof to the image processing selection unit 22. For example, the image data analysis unit 21 acquires a histogram of pixel values in the input image data of one image that can be acquired by the detection device 12, and acquires the number of pixels having a pixel value smaller than a specific reference value for each detection area of the wavelength bands so that an analysis result can be acquired.

For example, in a case where inspection is performed to a special subject or inspection is performed under a special light source, an image appears only in a detection area of a specific wavelength band or no image appears only in a detection area of a specific wavelength band. Therefore, as a result of the analysis of the input image data by the image data analysis unit 21, in a case where the number of pixels having a pixel value smaller than the specific reference value is less than a threshold value in the detection area of any of the wavelength bands, it can be determined that no image has appeared in the detection area of the wavelength band.

The image processing selection unit 22 selects any one of image processing in the first image processing unit 23a and image processing in the second image processing unit 23b so as to supply the input image data input from the detection device 12, in accordance with the analysis result supplied from the image data analysis unit 21. For example, in a case where the image appears in the detection areas of all the wavelength bands, the image processing selection unit 22 selects the image processing in the first image processing unit 23a, and in a case where no image appears in the detection area of any of the wavelength bands, the image processing selection unit 22 selects the image processing in the second image processing unit 23b.

That is, the image processing selection unit 22 supplies the input image data to the first image processing unit 23a in a case where the analysis result of the input image data indicates that the number of pixels having a pixel value smaller than the specific reference value is the threshold value or more in the detection areas of all the wavelength bands. Meanwhile, the image processing selection unit 22 supplies the input image data to the second image processing unit 23b in a case where the analysis result of the input image data indicates that the number of pixels having a pixel value smaller than the specific reference value is less than the threshold value in the detection area of any of the wavelength bands.

The first image processing unit 23a and the second image processing unit 23b individually perform the image processing to the input image data, as to be described later with reference to FIGS. 4 and 5. Then, the first image processing unit 23a and the second image processing unit 23b each supply divided image data including the input image data divided for each wavelength band and coordinate data indicating the coordinates of a feature point on the image acquired by the detection device 12, to the stitching processing unit 24.

Any one of the first image processing unit 23a and the second image processing unit 23b sequentially supplies the divided image data and the coordinate data to the stitching processing unit 24 every time the detection device 12 supplies the input image data of one image to the signal processing device 13. Then, the stitching processing unit 24 stitches divided images that have been consecutively supplied, for each wavelength band, so as to generate an output image indicated with the pixel values in each wavelength band. That is, the stitching processing unit 24 composites portions including a common point captured between adjacent divided images, to be superimposed on the basis of the coordinate data indicating the feature point on the image, and then generates an image larger than an image that can be captured by one time of exposure in the detection device 12.

Specifically, the stitching processing unit 24 estimates a corresponding feature point between the divided images, performs image processing of moving or deforming the divided images to superimpose the feature point of each divided image, and then performs image processing of blending the pixel values of portions being superimposed of the divided images each including the feature point in agreement with the other.

Accordingly, for example, when the detection device 12 consecutively acquires images of the object to be inspected and then acquisition of an image of the entire area to be inspected is completed for the object to be inspected, the stitching processing unit 24 can generate one output image including the object to be inspected captured with a wide range and high resolution. Then, the stitching processing unit 24 outputs data included in the output image having a wide range and high resolution (an image including a range captured wider than one image acquired by the detection device 12) as output image data.

Here, the output image having a wide range and high resolution, generated in the signal processing device 13, will be described with reference to FIG. 3.

Figure 3:
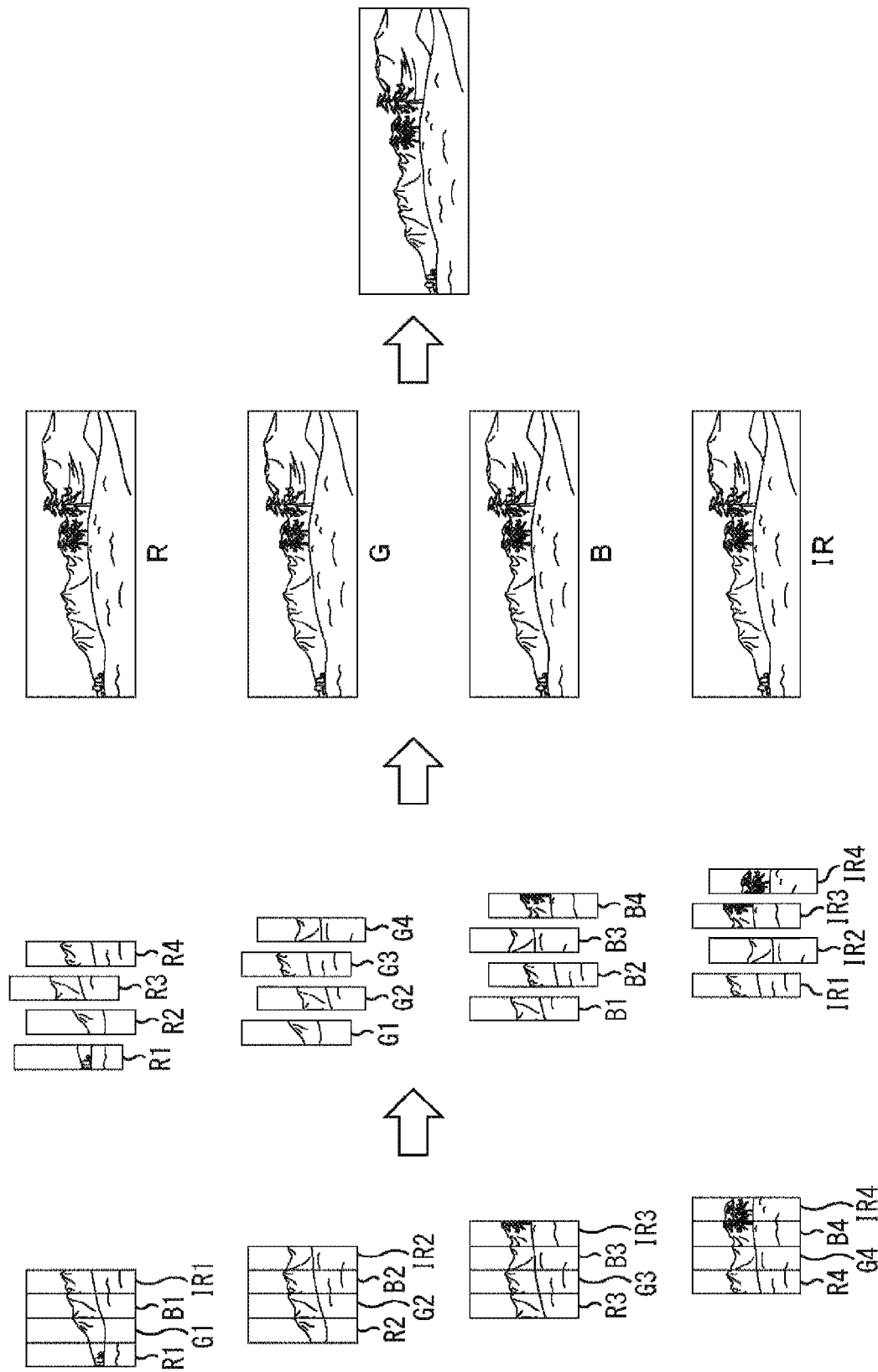
FIG. 3 is a view for describing processing of producing an output image having a wide range.

For example, a plurality of images (four images in the example of FIG. 3) consecutively acquired by the detection device 12, are illustrated in descending order at a left end of FIG. 3. For example, a first image includes a divided image R1 corresponding to the red detection area R, a divided image G1 corresponding to the green detection area G, a divided image B1 corresponding to the blue detection area B, and a divided image IR1 corresponding to the near-infrared detection area IR. In addition, second to fourth images have a configuration similar to that of the first image. Note that, after the four images, the detection device 12 sequentially, consecutively acquires a plurality of images, moving in the moving direction of FIG. 2, so as to supply the images to the signal processing device 13.

Then, the signal processing device 13 divides each of the images supplied from the detection device 12, into divided images, and the stitching processing unit 24 sequentially stitches the divided images in the same wavelength band. For example, the read divided image divided from the first image R1, a red divided image R2 divided from the second image, a red divided image R3 divided from the third image, and a red divided image R4 divided from the fourth image, are sequentially stitched by the stitching processing unit 24. Similarly, the stitching processing unit 24 stitches red divided images divided from the images, after the fourth image, supplied sequentially by the detection device 12 moving in the moving direction of FIG. 2. Note that, the stitching processing unit 24 stitches divided images in the other wavelength bands, for each wavelength band.

Accordingly, the signal processing device 13 can acquire an output image R, also referred to as a "composite image," the output image R including the red divided images stitched with a wide range and high resolution, an output image G including the green divided images stitched with a wide range and high resolution, an output image B including the blue divided images stitched with a wide range and high resolution, and an output image IR including the near-infrared divided images stitched with a wide range and high resolution. Then, for example, the signal processing device 13 may output image data included in the output image R (the "composite image"), the output image G, the output image B, and the output image IR, as output image data in an integrated format (color image data+near-infrared image data), as illustrated at a right end of FIG. 3.

In this manner, the vegetation inspection device 11 has the configuration, and can acquire an output image having a wide range and high resolution for each predetermined wavelength band. In addition, for example, vegetation inspection using the normalized difference vegetation index (NDVI), acquired from the green output image G and the near-infrared output image IR, can be performed to a wide range, such as a field, with high resolution.

Figure 4:
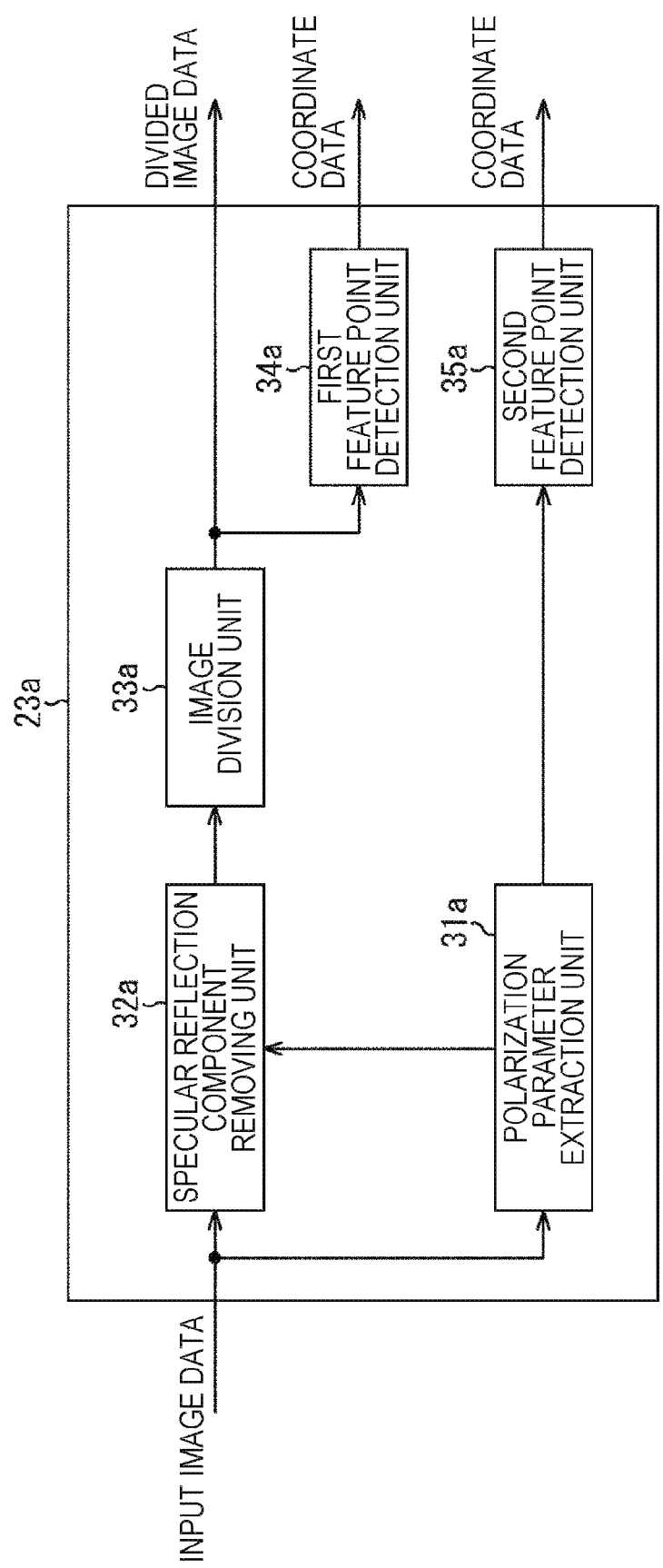
FIG. 4 is a block diagram of an exemplary configuration of a first image processing unit.

Next, FIG. 4 is a block diagram of an exemplary configuration of the first image processing unit 23a of FIG. 1.

As illustrated in FIG. 4, the first image processing unit 23a includes a polarization parameter extraction unit 31a, a specular reflection component removing unit 32a, an image division unit 33a, a first feature point detection unit 34a, and a second feature point detection unit 35a.

The polarization parameter extraction unit 31a extracts a polarization parameter indicating a polarization state of light on the surface of the object to be inspected, so as to supply the polarization parameter to the specular reflection component removing unit 32a and the second feature point detection unit 35a, on the basis of the input image data supplied from the detection device 12. For example, the polarization parameter includes a polarization level indicating the degree of polarization when the light reflects from the surface of the object to be inspected and a normal vector indicating the angle of a normal of the surface of the object to be inspected with respect to the detection device 12. As described above with reference to FIG. 2, the detection device 12 detects the light in a polarization direction every 45° with four pixels adjacent to each other. Therefore, the polarization parameter extraction unit 31a can extract the polarization parameter on the surface of the object to be inspected, detected through the four pixels, on the basis of polarization information acquired from the pixel values of the four pixels (the difference between the pixel values in response to the different polarization directions of the respective pixels).

The specular reflection component removing unit 32a removes a specular reflection component being a component including the light specularly reflecting from the surface of the object to be inspected, from the input image data supplied from the detection device 12, on the basis of the polarization parameter supplied from the polarization parameter extraction unit 31a. For example, the light reflecting from the surface of the object to be inspected typically includes a polarized specular reflection component and a non-polarized diffuse reflection component.

Therefore, the specular reflection component removing unit 32a can remove the specular reflection component, for example, with a method of independent component analysis (ICA), on the basis of an assumption that the diffuse reflection component and the specular reflection component are statistically independent. Then, the specular reflection component removing unit 32a acquires an image excluding the influence of the specular reflection component from an image acquired by the detection device 12, so as to supply image data thereof to the image division unit 33a.

The image division unit 33a divides the image data supplied from the specular reflection component removing unit 32a, in accordance with the detection areas of the wavelength bands detected by the detection device 12, so as to supply divided image data for each wavelength band to the first feature point detection unit 34a and the stitching processing unit 24 (FIG. 1).

The first feature point detection unit 34a detects a feature point indicating a distinctive point of a subject captured in the image based on the divided image data, so as to supply coordinate data indicating the coordinates of the feature point, to the stitching processing unit 24. For example, an edge of a point having a large variation in brightness or in color on the image, can be used as the feature point.

The second feature point detection unit 35a detects a feature point indicating a distinctive point of a subject captured in the image including the polarization parameter supplied from the polarization parameter extraction unit 31a, mapped, so as to supply coordinate data indicating the coordinates of the feature point to the stitching processing unit 24.

In this manner, the first image processing unit 23a has the configuration, and can supply the divided image data that includes the specular reflection component removed and has been divided for each wavelength band, the coordinate data indicating the coordinates of the feature point acquired from the divided image for each wavelength band, and the coordinate data indicating the coordinates of the feature point on the image acquired on the basis of the polarization parameter, to the stitching processing unit 24.

Figure 5:
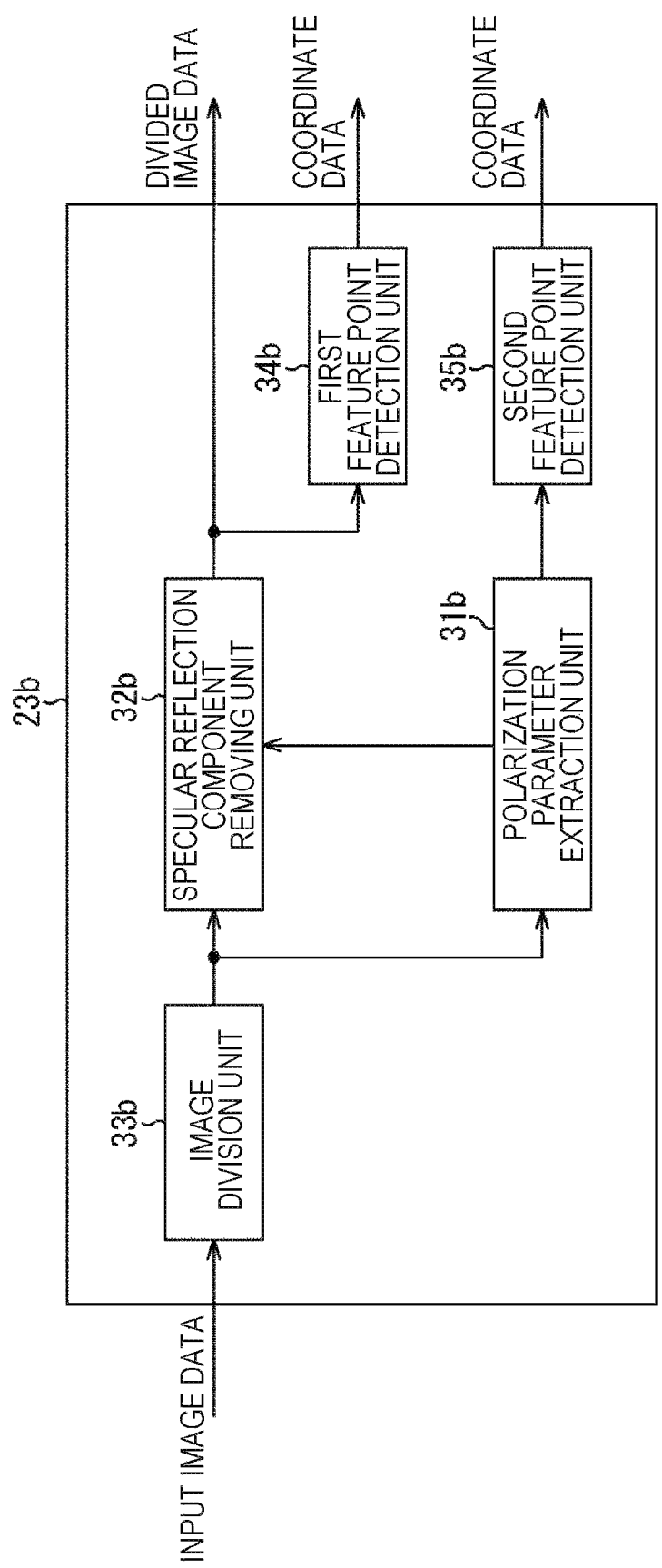
FIG. 5 is a block diagram of an exemplary configuration of a second image processing unit.

Next, FIG. 5 is a block diagram of an exemplary configuration of the second image processing unit 23b of FIG. 1.

As illustrated in FIG. 5, the second image processing unit 23b includes a polarization parameter extraction unit 31b, a specular reflection component removing unit 32b, an image division unit 33b, a first feature point detection unit 34b, and a second feature point detection unit 35b, similarly to the first image processing unit 23a of FIG. 2. Note that, the second image processing unit 23b has the sequence of performing the processing, different from that of the first image processing unit 23a of FIG. 2.

As illustrated in the figure, the detection device 12 supplies the input image data to the image division unit 33b and then the image division unit 33b divides the image data in accordance with the detection areas of the wavelength bands in the detection device 12, in the second image processing unit 23b. Then, the image division unit 33b supplies divided image data for each wavelength band, to the polarization parameter extraction unit 31b and the specular reflection component removing unit 32b. Therefore, the polarization parameter extraction unit 31b extracts a polarization parameter from the divided image data divided for each wavelength band, and the specular reflection component removing unit 32b removes a specular reflection component from the divided image data divided for each wavelength band, in the second image processing unit 23b. After that, the first feature point detection unit 34b and the second feature point detection unit 35b each extract a feature point similar to those described above, so as to supply coordinate data indicating the feature point to the stitching processing unit 24.

The second image processing unit 23b having the configuration in this manner, can supply the divided image data that has been divided for each wavelength band and includes the specular reflection component removed, the coordinate data indicating the coordinates of the feature point acquired from a divided image for each wavelength band, and the coordinate data indicating the coordinates of the feature point on the image acquired on the basis of the polarization parameter, to the stitching processing unit 24.

Therefore, the stitching processing unit 24 can stitch each divided image on the basis of the coordinate data indicating the coordinates of the feature point acquired from the divided image for each wavelength band and the coordinate data indicating the coordinates of the feature point on the image acquired on the basis of the polarization parameter, in the signal processing device 13. In this manner, the stitching processing unit 24 can improve the accuracy of stitching using a larger number of feature points.

In addition, the polarization parameter is typically independent of the color of an object so that the stitching processing unit 24 can use, for positioning, a feature point based on the polarization parameter in the entire size of the detection device 12, receiving no influence of a chromatic filter. Accordingly, the stitching processing unit 24 can perform the stitching with higher precision.

<Signal Processing>

Figure 6:
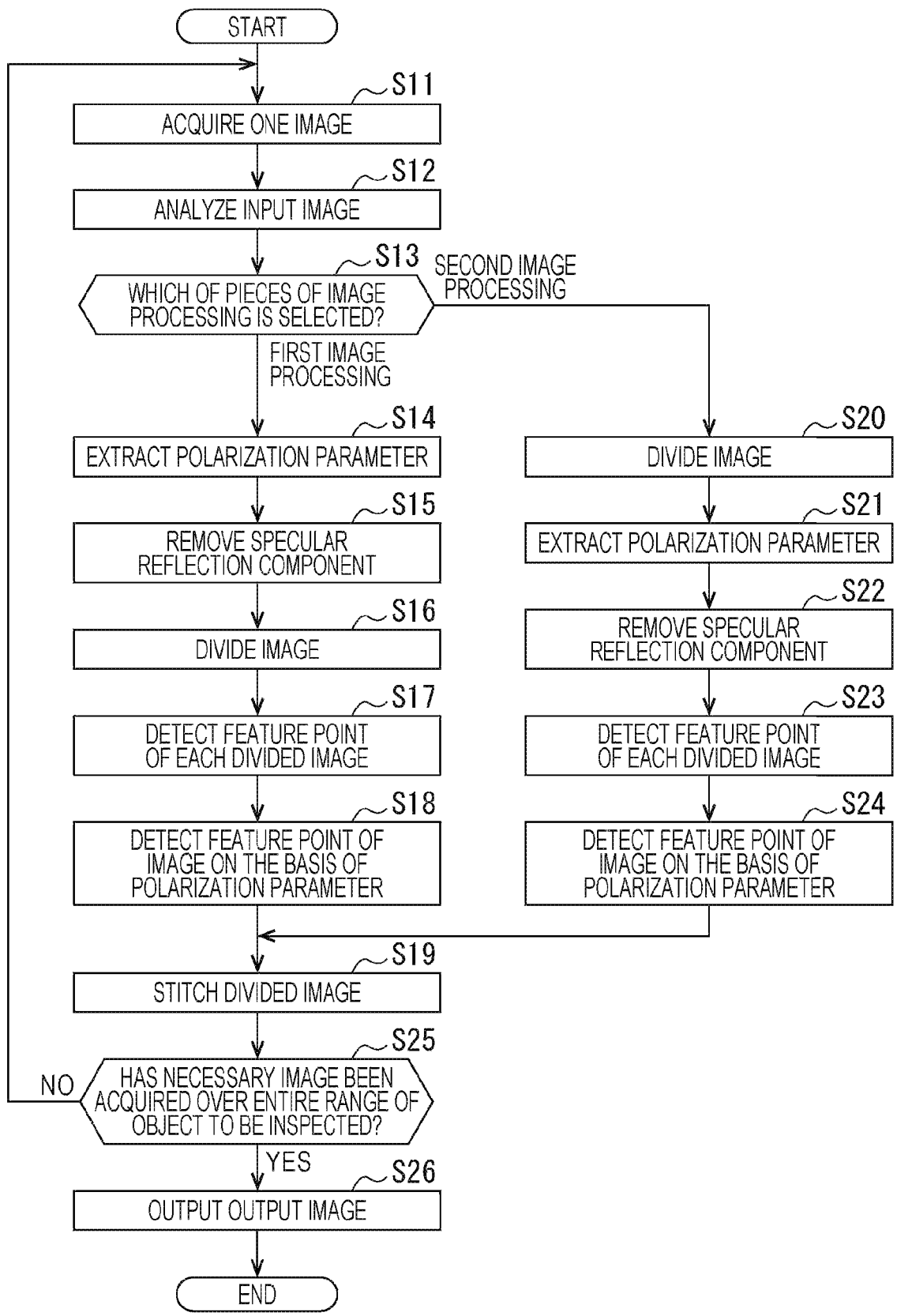
FIG. 6 is a flow chart for describing processing of acquiring an image having a wide range and high resolution.

FIG. 6 is a flow chart for describing processing of an image having a wide range and high resolution in the vegetation inspection device 11.

For example, when the vegetation inspection device 11 arrives at a starting point from which inspection is performed to an object to be inspected, the processing starts and the vegetation inspection device 11 moves in the moving direction as illustrated in FIG. 2. Then, at step S11, the detection device 12 acquires one image captured by one time of exposure so as to supply input image data of the image to the signal processing device 13.

At step S12, the image data analysis unit 21 of the signal processing device 13 performs analysis to an input image supplied from the detection device 12 at step S11 so as to supply an analysis result thereof to the image processing selection unit 22.

At step S13, the image processing selection unit 22 determines which of the image processing in the first image processing unit 23a and the image processing in the second image processing unit 23b is performed as image processing to the input image, in accordance with the analysis result supplied from the image data analysis unit 21 at step S12.

At step S13, in a case where the image processing selection unit 22 determines that the image processing in the first image processing unit 23a is performed to the input image, the image processing selection unit 22 supplies the input image to the first image processing unit 23a and then the processing proceeds to step S14.

At step S14, the polarization parameter extraction unit 31a of the first image processing unit 23a extracts a polarization parameter on the basis of the pixel values of four pixels having a different polarization direction, the four pixels being adjacent to each other in the image acquired by the detection device 12.

At step S15, the specular reflection component removing unit 32a removes a specular reflection component from the image acquired by the detection device 12, on the basis of the polarization parameter extracted by the polarization parameter extraction unit 31a at step S14.

At step S16, the image division unit 33a divides the image including the specular reflection component removed by the specular reflection component removing unit 32a at step S15, for each wavelength band detected by the detection device 12. Then, the image division unit 33a supplies a divided image for each wavelength band, to the first feature point detection unit 34a and the stitching processing unit 24.

At step S17, the first feature point detection unit 34a detects a feature point indicating a distinctive point on a subject captured in each divided image supplied from the image division unit 33a at step S16. Then, the first feature point detection unit 34a supplies coordinate data indicating the coordinates of the feature point detected from each divided image, to the stitching processing unit 24.

At step S18, the second feature point detection unit 35a detects a feature point indicating a distinctive point of a subject captured in the image including the polarization parameter mapped on the basis of the polarization parameter supplied from the polarization parameter extraction unit 31a. Then, the second feature point detection unit 35a supplies coordinate data indicating the coordinates of the feature point detected on the basis of the polarization parameter, for the entire image acquired by the detection device 12, to the stitching processing unit 24.

At step S19, the stitching processing unit 24 stitches each divided image supplied from the image division unit 33a at step S16, on the basis of the pieces of coordinate data supplied at steps S17 and S18.

Meanwhile, at step S13, in a case where the image processing selection unit 22 determines that the image processing in the second image processing unit 23b is performed to the input image, the image processing selection unit 22 supplies the input image to the second image processing unit 23b so that the processing proceeds to step S20.

At step S20, the image division unit 33b of the second image processing unit 23b divides the image acquired by the detection device 12, for each wavelength band detected by the detection device 12. Then, the image division unit 33b supplies a divided image for each wavelength band, to the polarization parameter extraction unit 31b and the specular reflection component removing unit 32b.

At step S21, the polarization parameter extraction unit 31b extracts a polarization parameter for each divided image divided by the image division unit 33b, on the basis of the pixels values of four pixels having a different polarization direction, the four pixels being adjacent to each other.

At step S22, the specular reflection component removing unit 32b removes a specular reflection component from each divided image divided by the image division unit 33b on the basis of the polarization parameter extracted by the polarization parameter extraction unit 31b at step S21. Then, the specular reflection component removing unit 32b supplies the divided images including the specular reflection component removed, to the first feature point detection unit 34b and the stitching processing unit 24.

At step S23, the first feature point detection unit 34b detects a feature point indicating a distinctive point of a subject captured in each divided image supplied from the specular reflection component removing unit 32b at step S22. Then, the first feature point detection unit 34b supplies coordinate data indicating the coordinates of the feature point detected from each divided image, to the stitching processing unit 24.

At step S24, the second feature point detection unit 35b detects a feature point indicating a distinctive point of a subject captured in the image including the polarization parameter mapped on the basis of the polarization parameter supplied from the polarization parameter extraction unit 31b. Then, the second feature point detection unit 35b supplies coordinate data indicating the coordinates of the feature point detected on the basis of the polarization parameter, for the entire image acquired by the detection device 12, to the stitching processing unit 24.

Then, the processing proceeds to step S19, and, in this case, the stitching processing unit 24 stitches each divided image supplied from the image division unit 33a at step S20, on the basis of the feature point indicated with each of the pieces of coordinate data supplied at steps S23 and S24.

After the processing at step S19, the processing proceeds to step S25 and then the detection device 12 determines whether a necessary image has been acquired over the entire range of the object to be inspected. For example, the detection device 12 can determine that the necessary image has been acquired, when the processing is performed from the starting point from which the inspection of the object to be inspected is performed and the vegetation inspection device 11 arrives at an end point.

At step S25, in a case where the detection device 12 determines that the necessary image has not been acquired, namely, in a case where the vegetation inspection device 11 has not arrived at the end point, the processing goes back to step S11 and then similar processing is repeatedly performed.

Meanwhile, at step S25, in a case where the detection device 12 determines that the necessary image has been acquired, namely, in a case where the vegetation inspection device 11 has arrived at the end point, the processing proceeds to step S26.

In this case, the stitching processing unit 24 has generated an image having a wide range and high resolution over the entire range of the object to be inspected, and, at step S26, the signal processing device 13 outputs, as an output image, an image produced by the stitching processing unit 24 so that the processing is completed.

As described above, the vegetation inspection device 11 can acquire an image captured with a wide range and high resolution for each wavelength band that can be detected by the detection device 12, over the entire range of the object to be inspected.

<Pixel Arrangement in Detection Device>

The exemplary arrangement illustrated in FIG. 2 above is schematically illustrated in order to easily describe the pixel arrangement in the detection device 12, and the detection device 12 includes several millions or several tens of millions of fine pixels arranged on the light-receiving surface, in practice. In addition, the detection device 12 includes the pixels arranged to divide the light-receiving surface into four sections on the basis of the detection area for each wavelength band, as illustrated in FIG. 2. In addition, the pixel arrangement in the detection device 12 is not limited to the example illustrated in FIG. 2.

The pixel arrangement in the detection device 12 will be described with reference to FIGS. 7 to 12.

Figure 7:
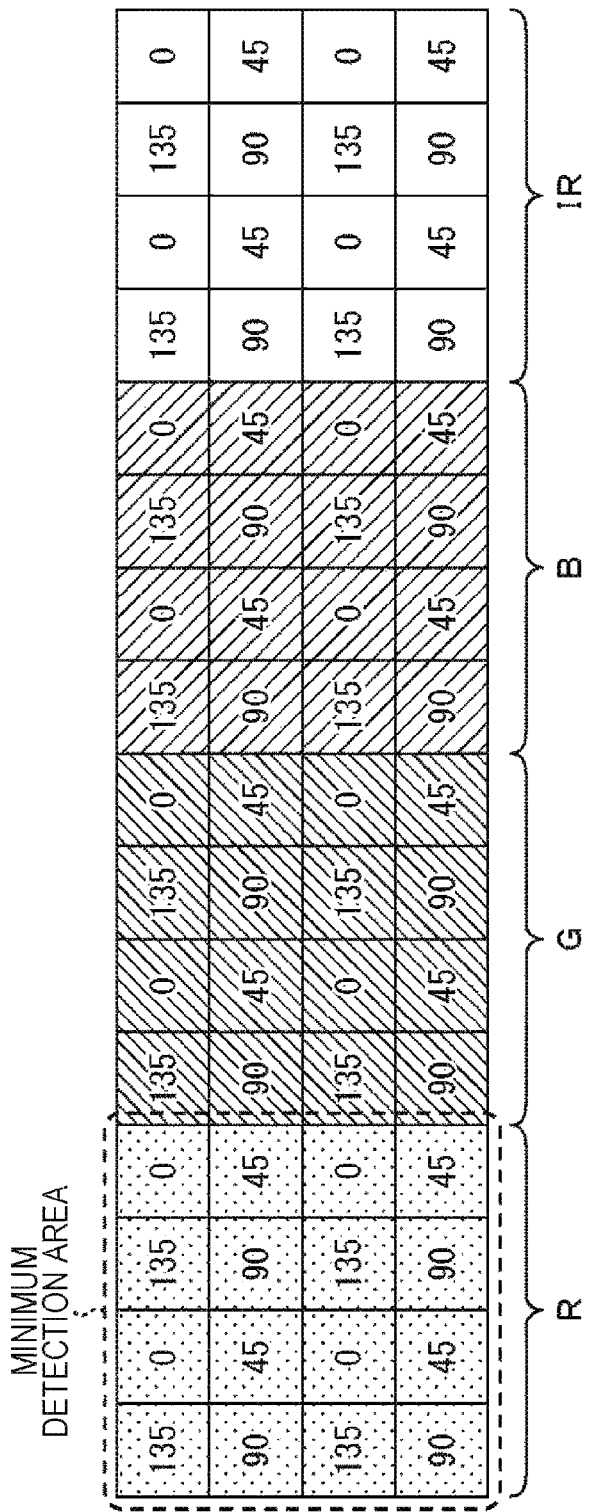
FIG. 7 is a view for describing an arrangement regulation of a minimum detection area of pixels.

FIG. 7 is a view for describing an arrangement regulation of a minimum detection area of the pixels in the detection device 12.

As illustrated in FIG. 7, the detection device 12 includes a minimum detection area including 16 pixels integrally arranged to detect light in the same wavelength band, the 16 pixels including four arranged in the row direction and four arranged in the column direction. In addition, as described above, the detection device 12 includes four pixels including a polarization direction set every 45°, arranged to be adjacent to each other in a 2×2 matrix form, and the minimum detection area includes 16 pixels including sets of the four pixels, arranged in a 2×2 matrix form.

In addition, the detection device 12 includes a red minimum detection area R, a green minimum detection area G, a blue minimum detection area B, and a near-infrared minimum detection area IR, arranged in the moving direction in which the detection device 12 relatively moves to the object to be inspected (in the row direction of FIG. 7). That is, when the red minimum detection area R, the green minimum detection area G, the blue minimum detection area B, and the near-infrared minimum detection area IR are viewed in the moving direction of the detection device 12, the arrangement regulation including the respective areas certainly arranged is provided. Accordingly, for example, when one-line scanning is performed to the object to be inspected, the detection device 12 can acquire divided images of the object to be inspected for the one line, in all the wavelength bands.

In addition, the detection device 12 includes each minimum detection area having a size double to a pattern cycle of the polarization filters (2×2) in the row direction and in the column direction, set. Each minimum detection area is set in this manner, and the detection device 12 consecutively acquires, for example, an image to be superimposed by the width of at least two pixels, relatively moving to the object to be inspected. Accordingly, the signal processing device 13 can stitch each divided image with the stitching processing unit 24, and then can output an output image having a wide range and high resolution for each wavelength band that can be detected in the detection device 12.

FIG. 8 is a view of an exemplary pixel arrangement of the minimum detection areas according to a different arrangement regulation.

As illustrated in FIG. 8, the detection device 12 can arrange the red minimum detection area R, the green minimum detection area G, the blue minimum detection area B, and the near-infrared minimum detection area IR, in accordance with an arrangement regulation including a 2×2 matrix.

The detection device 12 including the minimum detection areas arranged in this manner, is adopted and the vegetation inspection device 11 moves so that the respective minimum detection areas sequentially scan the object to be inspected.

Thus, an output image having a wide range and high resolution can be output for each wavelength band that can be detected in the detection device 12.

FIG. 9 is a view of a first modification of the pixel arrangement.

As illustrated in FIG. 9, the detection device 12 includes the red detection area R, the green detection area G, the blue detection area B, and the near-infrared detection area IR, arranged to be long and rectangular in the column direction in comparison to the pixel arrangement illustrated in FIG. 2.

Figure 10:
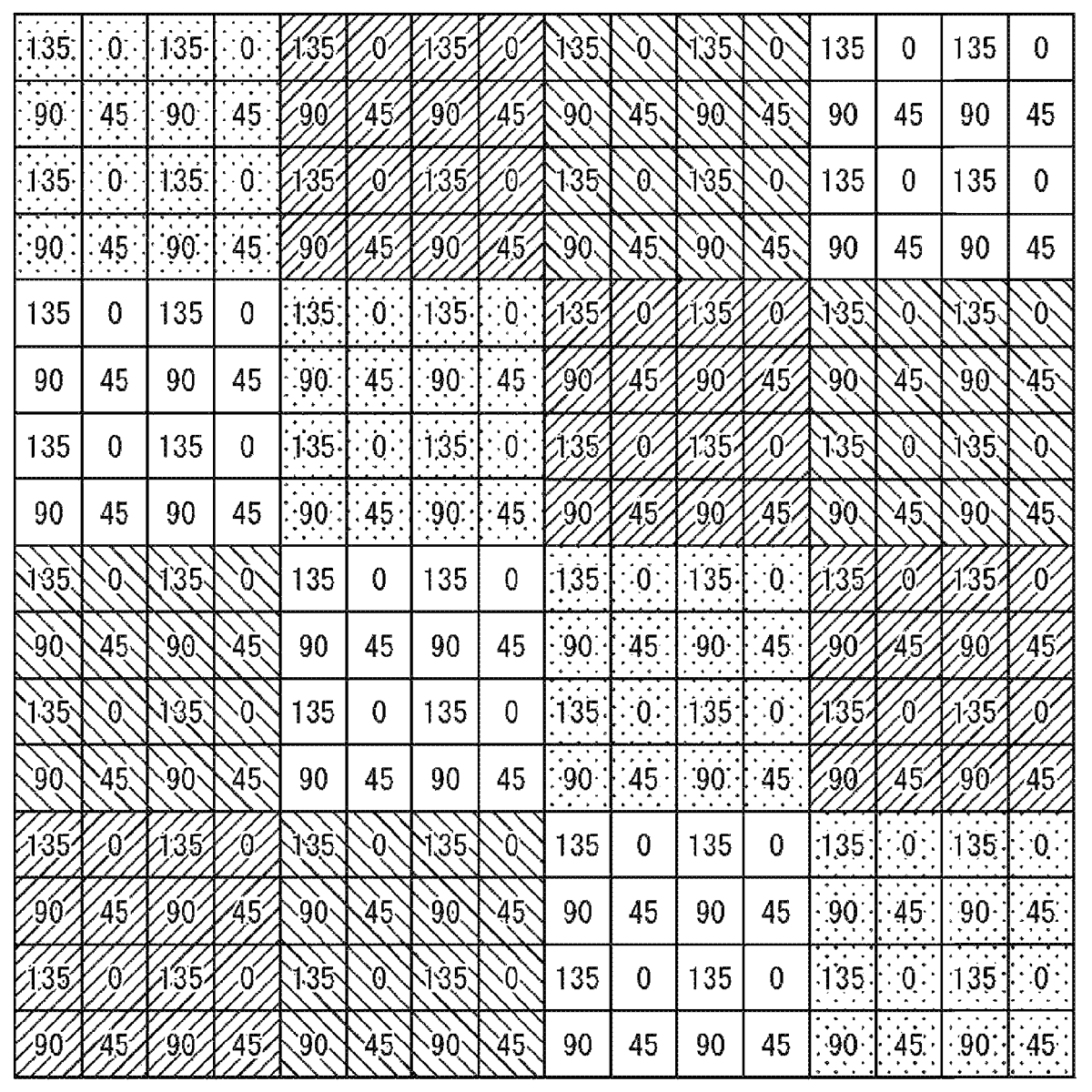

FIG. 10 is a view of a second modification of the pixel arrangement.

As illustrated in FIG. 10, the detection device 12 includes pixels arranged to have an arrangement regulation including the red detection area R, the green detection area G, the blue detection area B, and the near-infrared detection area IR certainly arranged when viewed in the row direction and in the column direction. That is, the exemplary pixel arrangement illustrated in FIG. 10 includes the detection areas of all the wavelength bands arranged for 16 detection areas arranged in a 4×4 matrix when viewed in the row direction and in the column direction.

Note that, the exemplary pixel arrangement illustrated in FIG. 10 schematically illustrates an arrangement of the detection area of each wavelength band. One detection area corresponds to a minimum detection area described with reference to FIG. 7, but each detection area may have a large size. For example, the entire light-receiving surface of the detection device 12 may be divided into 16 detection areas. Alternatively, detection areas including a larger number of pixels arranged can be arranged repeatedly in a pattern illustrated in FIG. 10.

FIG. 11 is a view of a third modification of the pixel arrangement.

As illustrated in FIG. 11, the detection device 12 can arrange, for example, a detection area including pixels that detect non-polarized light in all the wavelength bands, in addition to the red detection area R, the green detection area G, the blue detection area B, and the near-infrared detection area IR. That is, the detection device 12 may include a detection area including no polarization filter and no color filter. On the basis of the pixel values of the pixels arranged in the detection area, the signal processing device 13 can acquire a white (monochrome) image due to light in any polarization directions.

Figure 12:
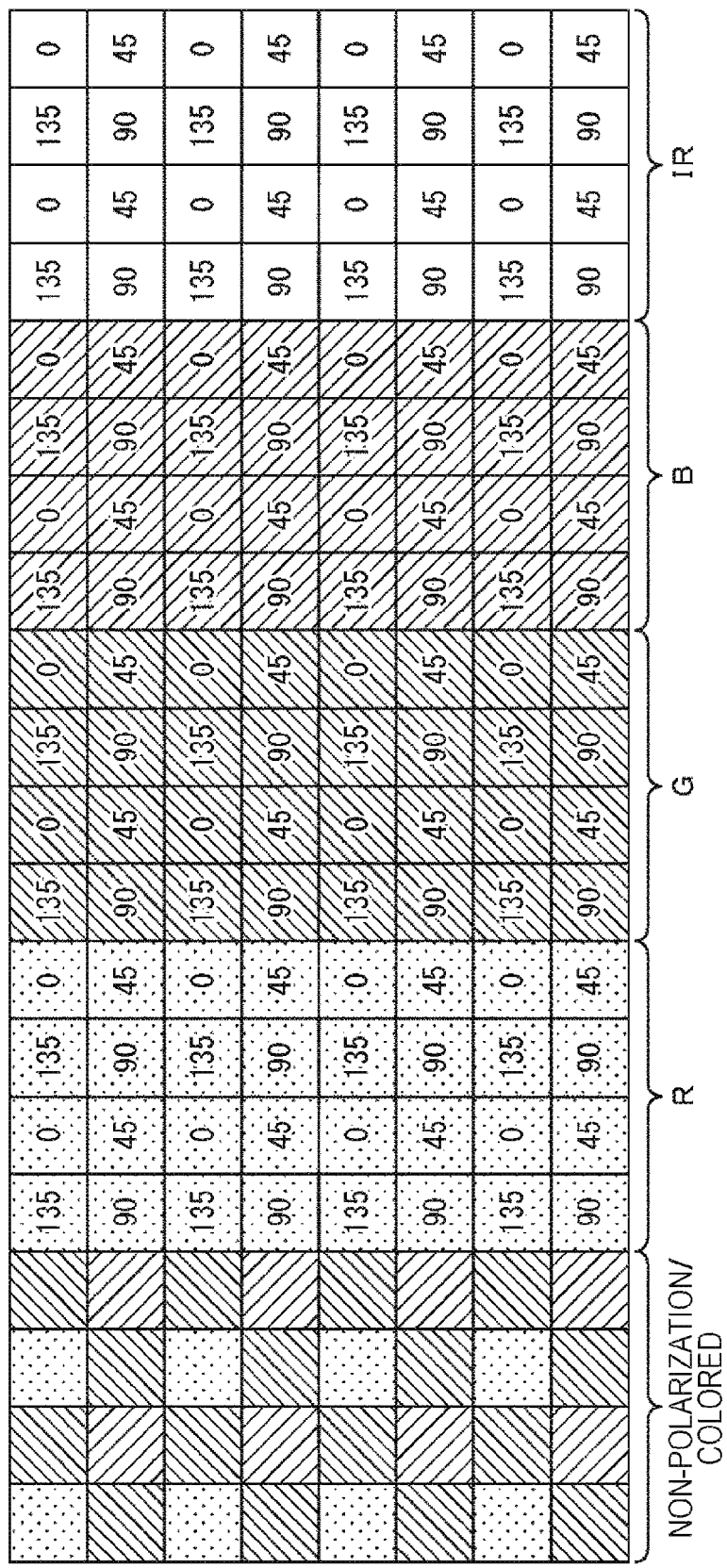
FIG. 12 is a view of a fourth modification of the pixel arrangement in the detection device.

FIG. 12 is a view of a fourth modification of the pixel arrangement.

As illustrated in FIG. 12, the detection device 12 can arrange, for example, a detection area including pixels that detect non-polarized light including three primary colors, in addition to the red detection area R, the green detection area G, the blue detection area B, and the near-infrared detection area IR. That is, the detection device 12 may include a detection area including no polarization filter but three-primary-color color filters arranged in a Bayer array for the pixels. On the basis of the pixel values of the pixels arranged in the detection area, the signal processing device 13 can acquire a color image due to light in any polarization directions.

<Exemplary Utilization of Vegetation Inspection Device>

Figure 13:
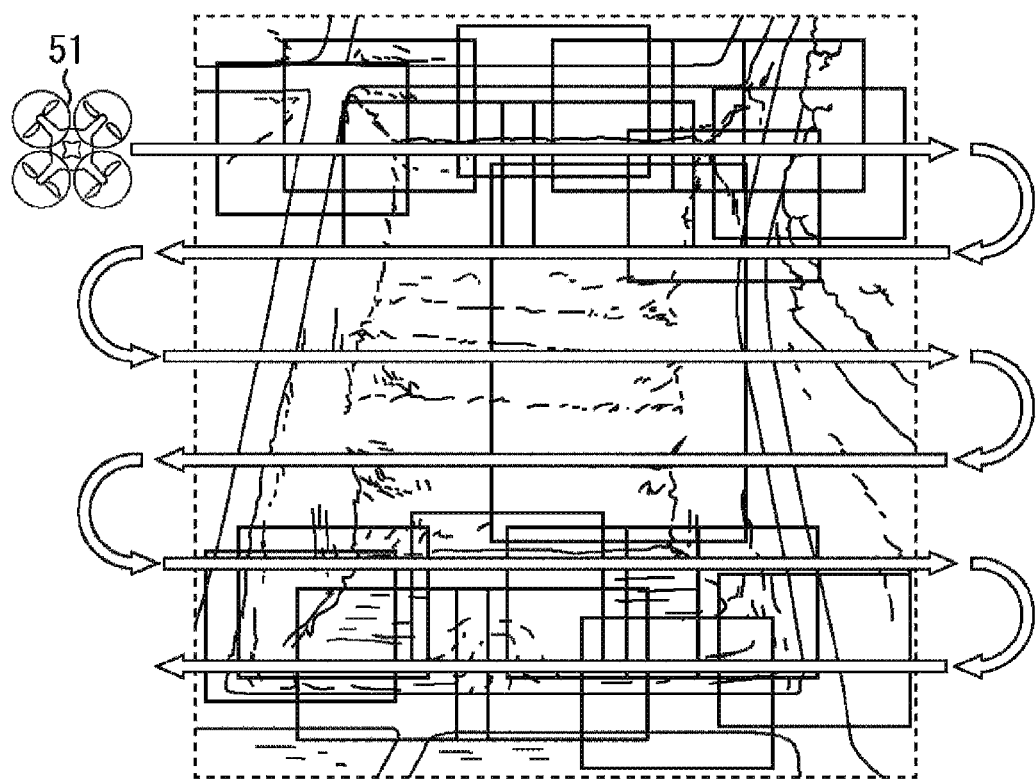
FIG. 13 is a view for describing exemplary utilization of the vegetation inspection device.
Figure 14:
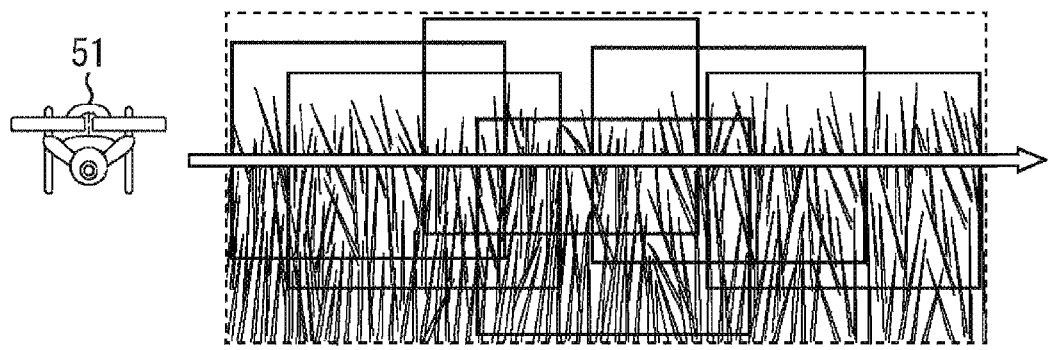
FIG. 14 is a view for describing different exemplary utilization of the vegetation inspection device.

As illustrated in FIGS. 13 and 14, for example, the vegetation inspection device 11 is mounted on an unmanned aerial vehicle (UAV) 51, and can perform inspection to an object to be inspected, moving with the unmanned aerial vehicle 51.

In FIG. 13, the vegetation inspection device 11 including the detection device 12 facing downward, is fixed to the unmanned aerial vehicle 51, and, for example, acquiring an output image including a crop in a field just under the sky, captured in a wide range in plan view, is illustrated as exemplary utilization. In FIG. 14, the vegetation inspection device 11 including the detection device 12 facing horizontally, is fixed to the unmanned aerial vehicle 51, and, for example, acquiring an output image including the raising state of the crop in height captured in a wide range with the unmanned aerial vehicle 51 moving along a farm road, is illustrated as exemplary utilization.

Note that, rectangles indicated with a solid line represent a plurality of images acquired by one time of exposure in the detection device 12 and a rectangle indicated with a broken line represents an output image produced by stitching the images, in FIGS. 13 and 14. In addition, an outline arrow represents a moving route of the unmanned aerial vehicle 51.

In this manner, the vegetation inspection device 11 consecutively acquires a plurality of images while the unmanned aerial vehicle 51 including the vegetation inspection device 11 mounted, is moving, so that the vegetation inspection device 11 can acquire one output image including the object to be inspected captured with a wide range and high resolution. Therefore, the vegetation of the crop in a wide range, such as the field, can be inspected in detail with the output image.

In addition, in a case where the vegetation inspection device 11 can acquire information on a sensor included in the unmanned aerial vehicle 51, the vegetation inspection device 11 performs stitching with the stitching processing unit 24 on the basis of information on the location and the position of the unmanned aerial vehicle 51 so that an output image that has been stitched with high precision can be acquired.

Note that, the vegetation inspection device 11 can appropriately select a size of the inspection area of each wavelength band in response to the size of the detection device 12 and the moving speed of the vegetation inspection device 11. In addition, the vegetation inspection device 11 can appropriately select a necessary number of wavelength bands in response to the purpose of inspection with the vegetation inspection device 11, for the number of wavelength bands (namely, the color number of chromatic filters) detected by the detection device 12.

For example, a degree of blur is estimated to occur in the moving distance and the moving direction of the unmanned aerial vehicle 51 for the purpose of inspecting the entire wide field with the unmanned aerial vehicle 51 as described above with reference to FIGS. 13 and 14. Thus, the size of each detection area is preferably made to be large (including a larger number of pixels) in order to securely stitch divided images. Meanwhile, for example, the size of each detection area may be made to be small for the purpose of performing inspection with the vegetation inspection device 11 minutely moving, such as for the purpose of detecting a small blemish of a small precision component.

Furthermore, the present technology can be applied to, for example, a vegetation inspection system coupled through a network in addition to being included in a single-body device, such as the vegetation inspection device 11. For example, the detection device 12 and the signal processing device 13 are coupled through the network so that an output image output from the signal processing device 13 can be transmitted to a display device or an analysis device through the network. Accordingly, inspection can be performed to a number of fields at remote locations as objects to be inspected, from any locations.

Note that, each piece of processing described with reference to the flow chart above is not necessarily performed in a time series in accordance with the sequence described as a flow chart, and processing performed in parallel or individually (e.g., parallel processing or processing with an object) is also included. In addition, a program may be performed with processing by one CPU or may be performed with distributed processing by a plurality of CPUs. In addition, a system means the entire device including a plurality of devices in the present specification.

In addition, the above processing in series (the signal processing method) can be performed by hardware or can be performed by software. In a case where the processing in series is performed by the software, a program included in the software is installed, from a program recording medium recording the program, into a computer built in dedicated hardware or a general purpose personal computer capable of performing various functions, for example, by installing various programs.

Figure 15:
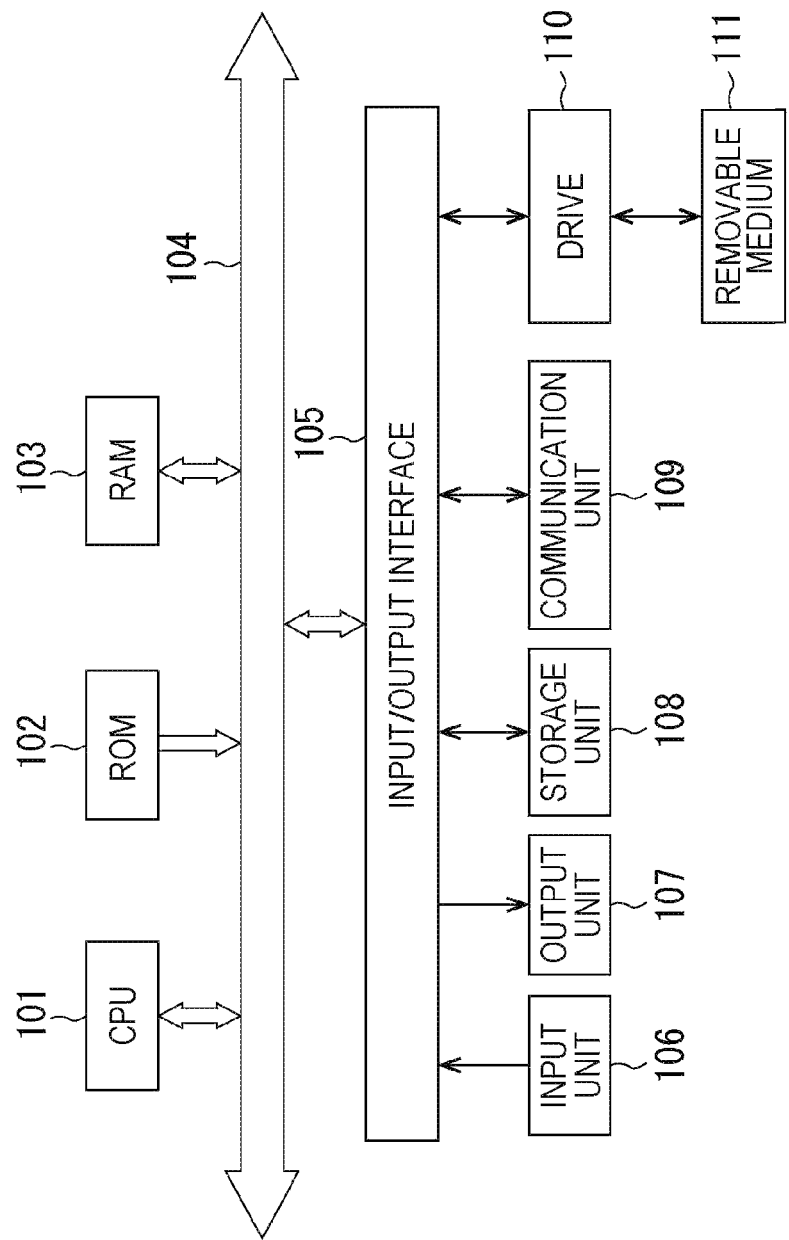
FIG. 15 is a block diagram of an exemplary configuration of one embodiment of a computer to which the present technology has been applied.

FIG. 15 is a block diagram of an exemplary configuration of hardware of a computer that performs the above processing in series with a program.

A central processing unit (CPU) 101, a read only memory (ROM) 102, and a random access memory (RAM) 103 are mutually coupled through a bus 104 in the computer.

An input/output interface 105 is further coupled to the bus 104. An input unit 106 including a keyboard, a mouse, and a microphone, an output unit 107 including a display and a speaker, a storage unit 108 including a hard disk and a nonvolatile memory, a communication unit 109 including a network interface, and a drive 110 that drives a removable medium 111, such as a magnetic disk, an optical disc, a magneto-optical disc, or a semiconductor memory, are coupled to the input/output interface 105.

In the computer having the above configuration, the CPU 101 loads, for example, the program stored in the storage unit 108 into the RAM 103 so as to execute the program through the input/output interface 105 and the bus 104 so that the above processing in series is performed.

The program executed by the computer (the CPU 101) is recorded in the removable medium 111 being a package medium including, for example, the magnetic disk (a flexible disk included), the optical disc (e.g., a compact disc-read only memory (CD-ROM) or a digital versatile disc (DVD)), the magneto-optical disc, or the semiconductor memory, so as to be provided or the program is provided through a transmission medium of wired communication or radio communication, such as a local area network, the Internet, or digital satellite broadcasting.

Then, the removable medium 111 is put into the drive 110 so that the program can be installed into the storage unit 108 through the input/output interface 105. In addition, the communication unit 109 receives the program through the transmission medium of the wired communication or the radio communication so that the program can be installed into the storage unit 108. Additionally, the program can be previously installed into the ROM 102 and the storage unit 108.

Figure 16:
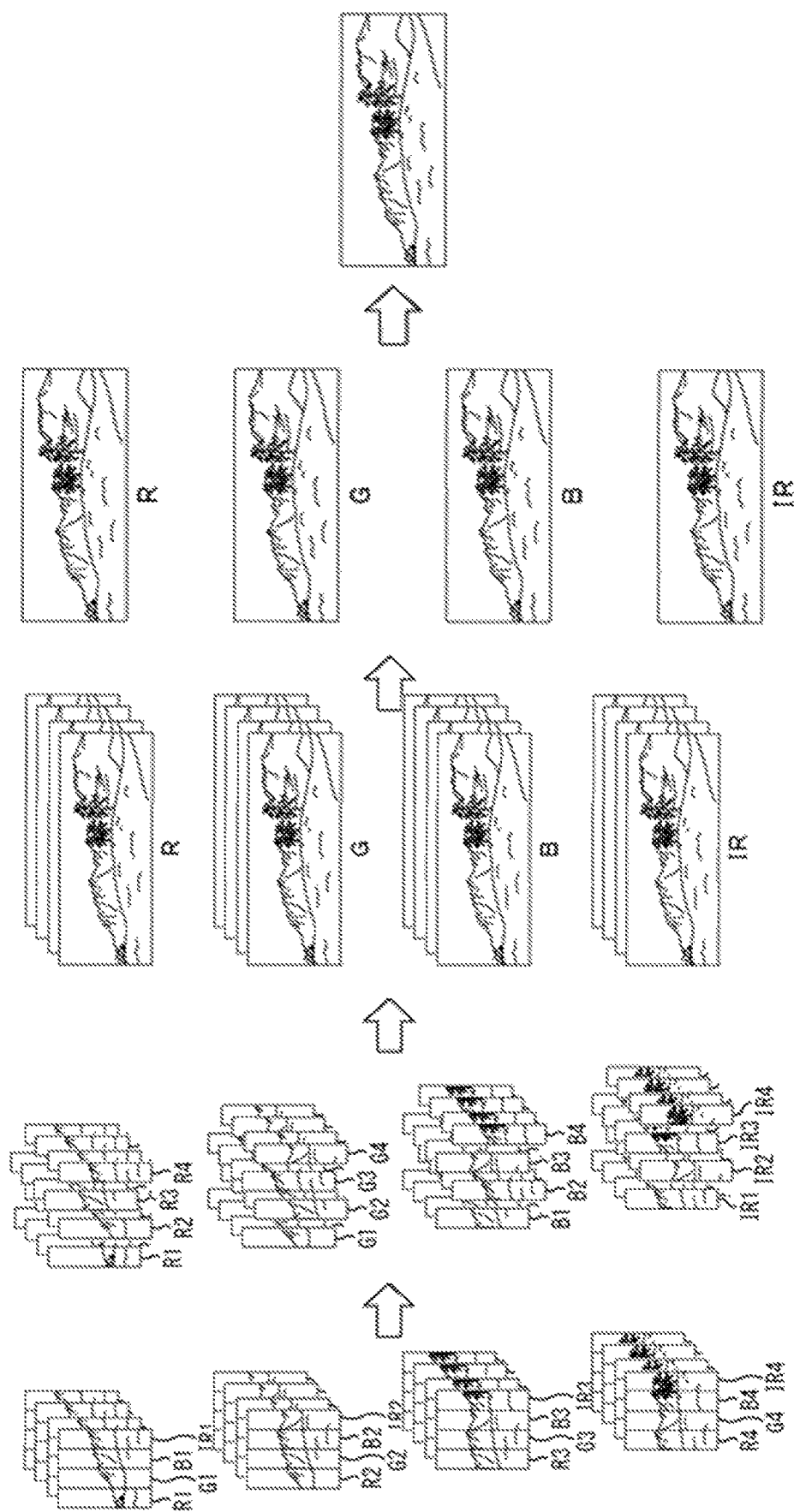
FIG. 16 is another view for describing processing of producing an output image having a wide range.

FIG. 16 is another view for describing processing of producing an output image having a wide range.

For example, pluralities of images (each plurality having four image sets of four images for a total of sixteen images in the example of FIG. 16) computed from image data that is captured in a time series, the image data being acquired by the detection device 12, are illustrated in descending order at a left end of FIG. 16. For example, as the vegetation inspection device is moved relative to the object to be inspected, the detection device 12 can sequentially capture a plurality of image data.

Each of the image sets captured at a particular exposure includes information for different polarization angles for each of the wavelength strips. For example, a first exposure is performed to capture part of an object to be inspected, as the vegetation inspection device 11 is moved along the moving direction of FIG. 2. According to FIG. 16, a first image set has four images, shown as stacked images on the top left end of FIG. 16, represent the image data captured at the first exposure. The four images of the first image set corresponds to four polarization angles of 0°, 45°, 90°, and 135° and is computed by the signal processing device 12, based on the image data acquired from the first exposure. As the vegetation inspection device 11 is moved along the moving direction of FIG. 2, a second exposure is performed to capture another part of the object to be inspected. A second image set with four other images stacked one over the other, shown below the first image set and slightly shifted to the right in FIG. 16 represent the image data captured at the second exposure. The four images of the second image set corresponds to four polarization angles of 0°, 45°, 90°, and 135° and is computed by the signal processing device 12, based on the image data acquired from the second exposure. Similarly, the vegetation inspection device 12 is further moved along the moving direction and third and fourth image sets, each with four images, are shown in the left end of FIG. 16.

Then, the signal processing device 13 divides the image data supplied from the detection device 12 into pluralities of divided images based on the wavelength band and the polarization angle. The stitching processing unit 24 sequentially stitches each plurality of the pluralities of divided images in the same wavelength band together. For example, based on the red wavelength band and the polarization angle of zero degrees, a red divided image R1 is divided from the first image set of the first plurality of images, a red divided image R2 is divided from the first image set of the second plurality of images, a red divided image R3 is divided from the first image set of the third plurality of images, and a red divided image R4 is divided from the first image set of the fourth plurality of images, are sequentially stitched by the stitching processing unit 24. Similarly, the stitching processing unit 24 stitches red divided images divided from the second image sets (polarization angle of forty-five degrees), the third image sets (polarization angle of ninety degrees), and the fourth image sets (polarization angle of one-hundred and thirty-five degrees) of the pluralities of images. Note that, the stitching processing unit 24 stitches divided images with the same polarization angle in the other wavelength bands, for each wavelength band.

Accordingly, the signal processing device 13 can acquire a plurality of output red images R (polarization angles of 0, 45, 90, and 135) including the red divided images stitched with a wide range and high resolution, a plurality of output green images G (polarization angles of 0, 45, 90, and 135) including the green divided images stitched with a wide range and high resolution, a plurality of output blue images B (polarization angles of 0, 45, 90, and 135) including the blue divided images stitched with a wide range and high resolution, and a plurality of output near-infrared images IR (polarization angles of 0, 45, 90, and 135) including the near-infrared divided images stitched with a wide range and high resolution.

The signal processing device 13 may use the plurality of output red images R (polarization angles of 0, 45, 90, and 135) and a polarization fitting process to generate a single output red image at any polarization angle. The signal processing device 13 may use the plurality of output green images G (polarization angles of 0, 45, 90, and 135) and the polarization fitting process to generate a single output green image at any polarization angle. The signal processing device 13 may use the plurality of output blue images B (polarization angles of 0, 45, 90, and 135) and the polarization fitting process to generate a single output blue image at any polarization angle. The signal processing device 13 may use the plurality of output near-infrared images IR (polarization angles of 0, 45, 90, and 135) and the polarization fitting process to generate a single output near-infrared image at any polarization angle.

Alternatively, the signal processing device 13 may select one of the plurality of output red images R (polarization angles of 0, 45, 90, and 135) as a single output red image at a pre-determined polarization angle (for example, 0, 45, 90, or 135). The signal processing device 13 may select one of the plurality of output green images G (polarization angles of 0, 45, 90, and 135) as a single output green image at a pre-determined polarization angle (for example, 0, 45, 90, or 135). The signal processing device 13 may select one of the plurality of output blue images B (polarization angles of 0, 45, 90, and 135) as a single output blue image at a pre-determined polarization angle (for example, 0, 45, 90, or 135). The signal processing device 13 may select one of the plurality of output near-infrared images IR (polarization angles of 0, 45, 90, and 135) as a single output near-infrared image at a pre-determined polarization angle (for example, 0, 45, 90, or 135).

Then, for example, the signal processing device 13 may output image data included in the single output red image, the single output green image, the single output blue image, and the single output near-infrared image, as output image data in an integrated format (color image data+near-infrared image data), as illustrated at a right end of FIG. 16. In this manner, the vegetation inspection device 11 has the configuration, and can acquire an output image having a wide range and high resolution for each predetermined wavelength band at any polarization angle.

Figure 17:
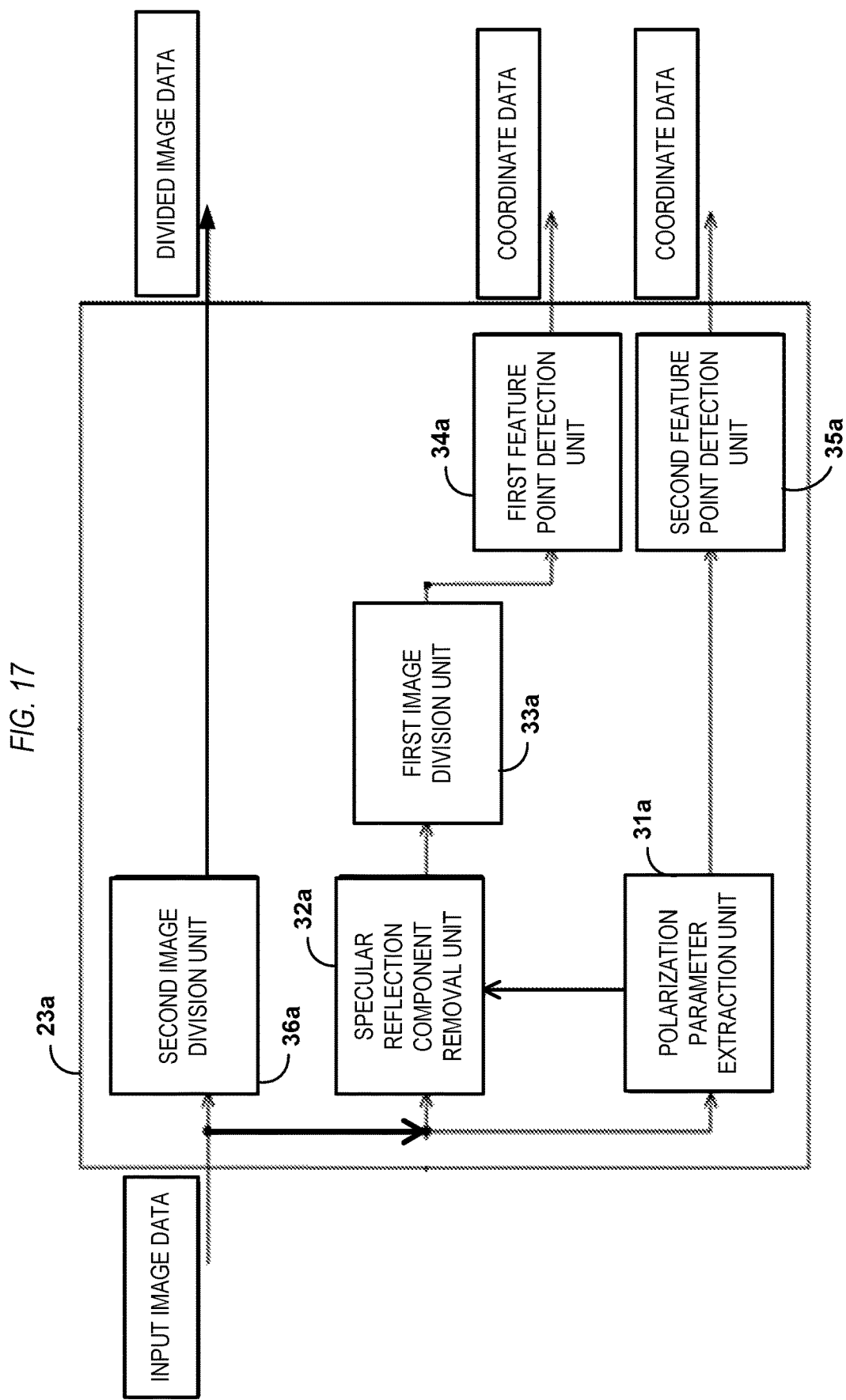
FIG. 17 is a block diagram of another exemplary configuration of a first image processing unit.

Next, FIG. 17 is a block diagram of another exemplary configuration of the first image processing unit 23a of FIG. 1.

As illustrated in FIG. 17, the first image processing unit 23a includes a polarization parameter extraction unit 31a, a specular reflection component removing unit 32a, a first image division unit 33a, a first feature point detection unit 34a, a second feature point detection unit 35a, and a second image division unit 36a.

The polarization parameter extraction unit 31a extracts a polarization parameter indicating a polarization state of light on the surface of the object to be inspected, so as to supply the polarization parameter to the specular reflection component removing unit 32a and the second feature point detection unit 35a, on the basis of the input image data supplied from the detection device 12. For example, the polarization parameter includes a polarization level indicating the degree of polarization when the light reflects from the surface of the object to be inspected and a normal vector indicating the angle of a normal of the surface of the object to be inspected with respect to the detection device 12. As described above with reference to FIG. 2, the detection device 12 detects the light in a polarization direction every 45° with four pixels adjacent to each other. Therefore, the polarization parameter extraction unit 31a can extract the polarization parameter on the surface of the object to be inspected, detected through the four pixels, on the basis of polarization information acquired from the pixel values of the four pixels (the difference between the pixel values in response to the different polarization directions of the respective pixels).

The specular reflection component removing unit 32a removes a specular reflection component being a component including the light specularly reflecting from the surface of the object to be inspected, from the input image data supplied from the detection device 12, on the basis of the polarization parameter supplied from the polarization parameter extraction unit 31a. For example, the light reflecting from the surface of the object to be inspected typically includes a polarized specular reflection component and a non-polarized diffuse reflection component.

Therefore, the specular reflection component removing unit 32a can remove the specular reflection component, for example, with a method of independent component analysis (ICA), on the basis of an assumption that the diffuse reflection component and the specular reflection component are statistically independent. Then, the specular reflection component removing unit 32a acquires an image excluding the influence of the specular reflection component from an image acquired by the detection device 12, so as to supply image data thereof to the first image division unit 33a.

The first image division unit 33a divides the image data supplied from the specular reflection component removing unit 32a, in accordance with the detection areas of the wavelength bands detected by the detection device 12, so as to supply divided image data for each wavelength band to the first feature point detection unit 34a.

The first feature point detection unit 34a detects a feature point indicating a distinctive point of a subject captured in the image based on the divided image data from the first image division unit 33a, so as to supply coordinate data indicating the coordinates of the feature point, to the stitching processing unit 24. For example, an edge of a point having a large variation in brightness or in color on the image, can be used as the feature point. In an alternative embodiment, the first feature point detection unit 34a may detect a feature point indicating a distinctive point of a subject captured in the image based on the divided image data from the second image division unit 36a instead of the first image division unit 33a, so as to supply coordinate data indicating the coordinates of the feature point, to the stitching processing unit 24.

The second feature point detection unit 35a detects a feature point indicating a distinctive point of a subject captured in the image including the polarization parameter supplied from the polarization parameter extraction unit 31a, mapped, so as to supply coordinate data indicating the coordinates of the feature point to the stitching processing unit 24.

The second image division unit 36a divides the input image data supplied from the detection device 12, in accordance with the polarization angle associated with each pixel of the detection device 12, so as to supply divided image data for each polarization angle to the stitching processing unit 24 (FIG. 1).

In this manner, the first image processing unit 23a has the configuration, and can supply the divided image data based on polarization angles of the pixels of the detection device 12, and the divided image data includes the specular reflection component to the stitching processing unit 24. In this manner, the first image processing unit 23 has the configuration, and can supply the coordinate data indicating the coordinates of the feature point acquired from the divided image data that includes the specular reflection component removed and has been divided for each wavelength band, and the coordinate data indicating the coordinates of the feature point on the image acquired on the basis of the polarization parameter, to the stitching processing unit 24.

Note that, the stitching processing unit 24 may use one or both of the coordinate data from the first feature point detection unit 34a and the second feature point detection unit 35a. In addition, note that, the polarization angle of the divided image data to be stitched by the stitching processing unit 24 may be specified by a user or selected by the stitching processing unit 24 based on a result of image analysis. For example, the specular reflection component determined by the specular reflection component removal unit 32a may be used by the stitching processing unit 24 to select a polarization angle with the lowest reflection component. As described above, the stitching processing unit 24 may use the divided image data (for example, color image data+near-infrared image data) with a polarization fitting process to generate a single output image at any polarization angle.

Figure 18:
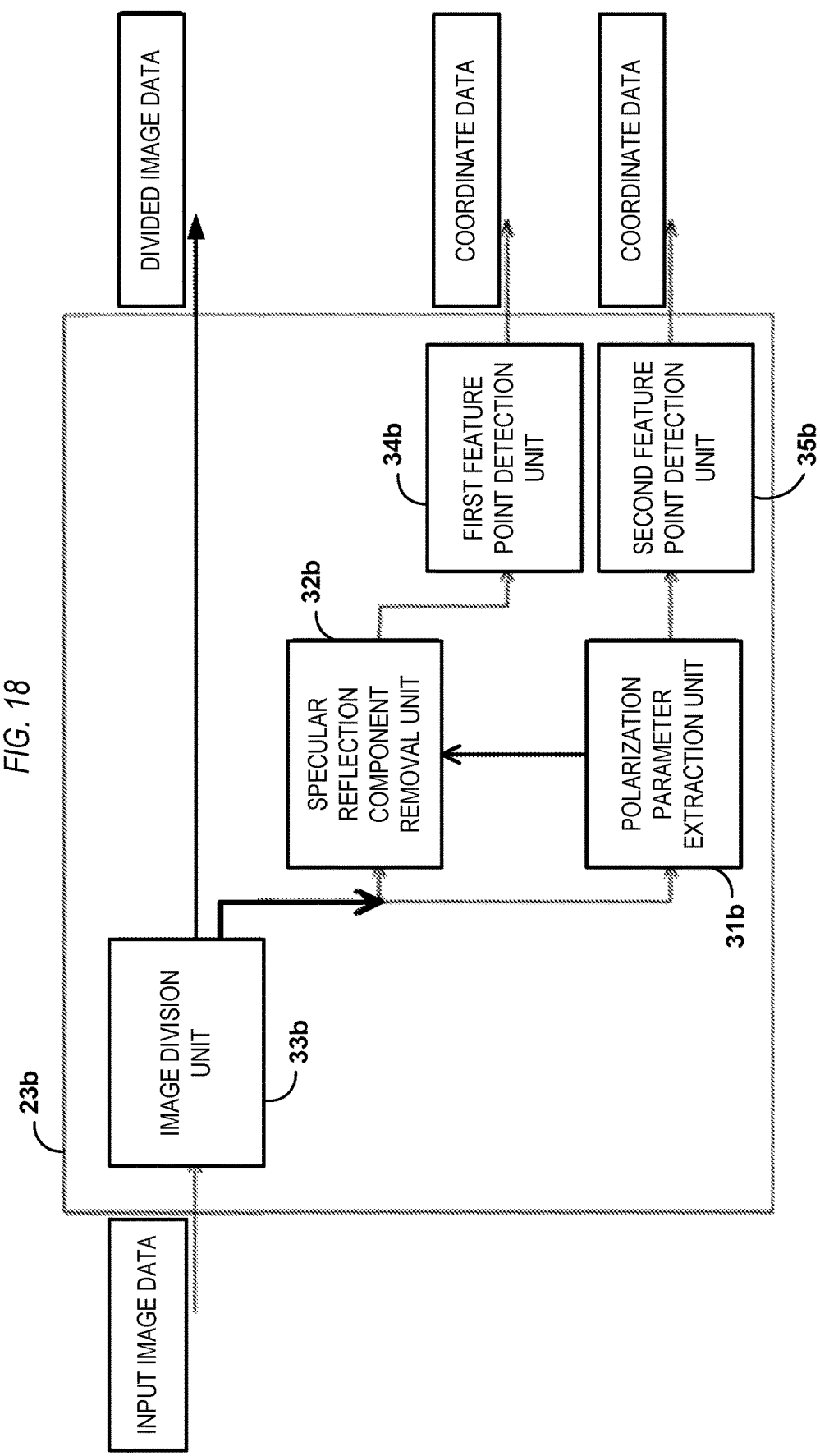
FIG. 18 is a block diagram of another exemplary configuration of a second image processing unit.

Next, FIG. 18 is a block diagram of another exemplary configuration of the second image processing unit 23b of FIG. 1.

As illustrated in FIG. 18, the second image processing unit 23b includes a polarization parameter extraction unit 31b, a specular reflection component removing unit 32b, an image division unit 33b, a first feature point detection unit 34b, and a second feature point detection unit 35b, similarly to the first image processing unit 23a of FIG. 17. Note that, the second image processing unit 23b has the sequence of performing the processing, different from that of the first image processing unit 23a of FIG. 17.

As illustrated in FIG. 18, the detection device 12 supplies the input image data to the image division unit 33b. The image division unit 33b divides the input image data supplied from the detection device 12, in accordance with the polarization angle associated with each pixel of the detection device 12, so as to supply divided image data for each polarization angle to the stitching processing unit 24 (FIG. 1). The image division unit 33b further divides the divided image data corresponding to each of the polarized angles, in accordance with the detection areas of the wavelength bands in the detection device 12, in the second image processing unit 23b. Then, the image division unit 33b supplies divided image data for each wavelength band, to the polarization parameter extraction unit 31b and the specular reflection component removing unit 32b. Therefore, the polarization parameter extraction unit 31b extracts a polarization parameter from the divided image data divided for each wavelength band, and the specular reflection component removing unit 32b removes a specular reflection component from the divided image data divided for each wavelength band, in the second image processing unit 23b. After that, the first feature point detection unit 34b and the second feature point detection unit 35b each extract a feature point similar to those described above, so as to supply coordinate data indicating the feature point to the stitching processing unit 24.

The second image processing unit 23b having the configuration in this manner, can supply the divided image data based on polarization angles of the pixels of the detection device 12, and the divided image data includes the specular reflection component to the stitching processing unit 24. The second image processing unit 23b can also supply the coordinate data indicating the coordinates of the feature point acquired from a divided image for each wavelength band, and the coordinate data indicating the coordinates of the feature point on the image acquired on the basis of the polarization parameter, to the stitching processing unit 24.

Note that, the stitching processing unit 24 may use one or both of the coordinate data from the first feature point detection unit 34b and the second feature point detection unit 35b. In addition, note that, the polarization angle of the divided image data to be stitched by the stitching processing unit 24 may be specified by a user or selected by the stitching processing unit 24 based on a result of image analysis. For example, the specular reflection component determined by the specular reflection component removal unit 32b may be used by the stitching processing unit 24 to select a polarization angle with the lowest reflection component. As described above, the stitching processing unit 24 may use the divided image data (for example, color image data+near-infrared image data) with a polarization fitting process to generate a single output image at any polarization angle.

Figure 19:
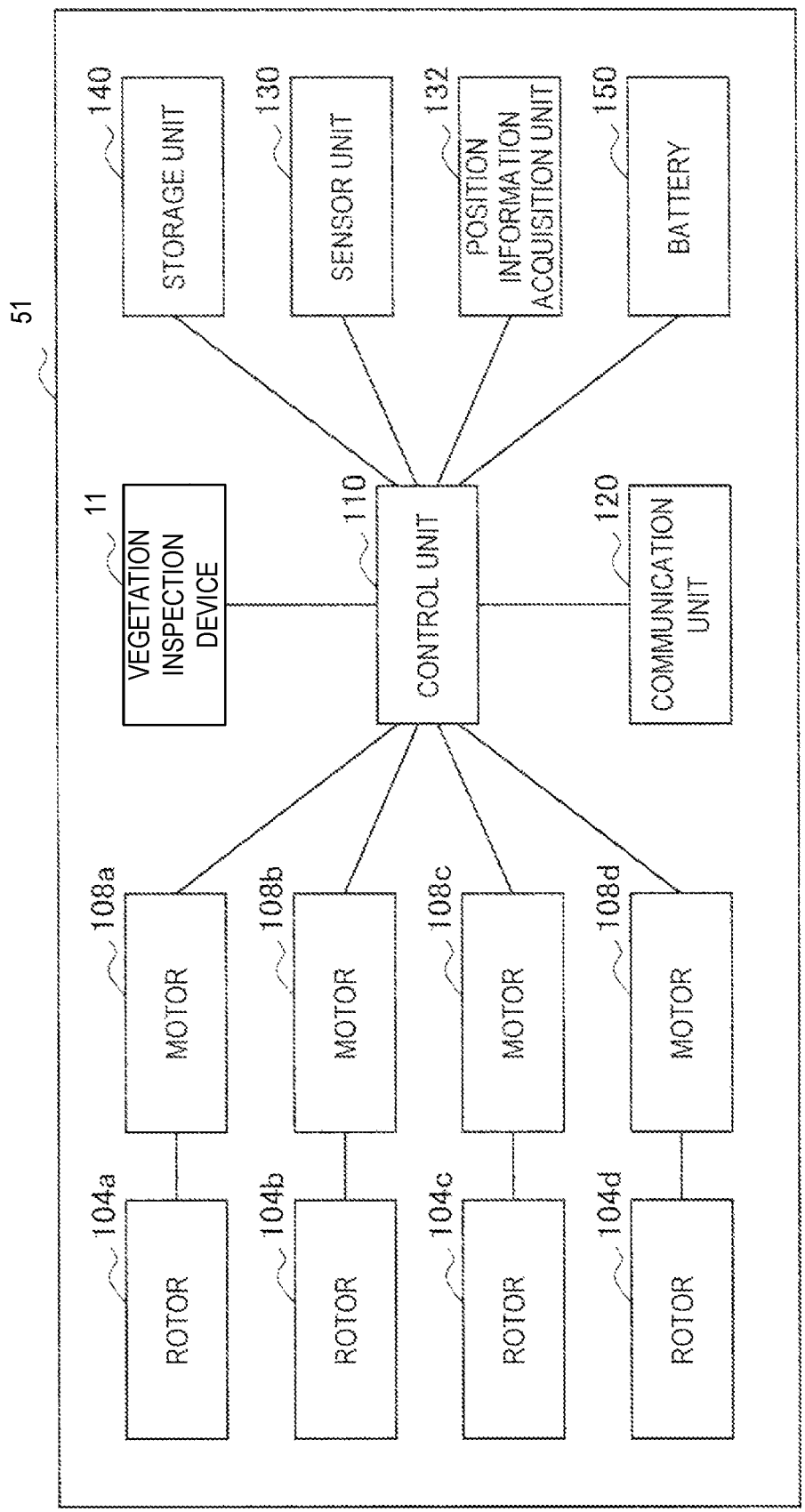
FIG. 19 is a block diagram of an exemplary embodiment of an unmanned aerial vehicle.

FIG. 19 is a block diagram of an exemplary embodiment of the unmanned aerial vehicle 51 of FIGS. 13 and 14.

As illustrated in FIG. 19, the unmanned aerial vehicle 51 according to an embodiment of the present disclosure is configured to include a vegetation inspection device 11, rotors 104a to 104d, motors 108a to 108d, a control unit 110, a communication unit 120, a sensor unit 130, a position information acquisition unit 132, a storage unit 140, and a battery 150.

The control unit 110 controls an operation of the unmanned aerial vehicle 51. For example, the control unit 110 can control an adjustment of the rotational speed of the rotors 104a to 104d by an adjustment of the rotational speed of the motors 108a to 108d, the imaging process by the vegetation inspection device 11, the transmission and reception processes of information to/from other devices (for example, a control terminal) through the communication unit 120, and storage and reading of information in and from the storage unit 140.

In the present embodiment, the control unit 110 controls a flight in which the rotational speed of the motors 108a to 108d is adjusted and execution of the imaging process of the still image by the imaging device 101 based on the flight information transmitted from the control terminal 200. The control unit 110 controls the motors 108a to 108d or the vegetation inspection device 11 based on the flight information transmitted from the control terminal. While the unmanned aerial vehicle is moving across a crop field or a farm road as illustrated in FIG. 14, the control unit 110 can control the detection device 12 to consecutively capture one or more images, and provide the one or more images to the control terminal based on a request of the control terminal. Further, the control unit 110 can control the stitching processing unit 24 to stitch the captured images to provide an output image to the control terminal based on another request of the control terminal.

The rotors 104a to 104d cause the unmanned aerial vehicle 51 to fly by generating a lift force from rotation thereof. Rotation of the rotors 104a to 104d is caused by rotation of the motors 108a to 108d. The motors 108a to 108d cause the rotors 104a to 104d to rotate. The rotation of the motors 108a to 108d can be controlled by the control unit 110.

The communication unit 120 performs transmission and reception processes of information to/from the control terminal through wireless communication. The unmanned aerial vehicle 51 transmits image data captured by the vegetation inspection device 11 from the communication unit 120 to the control terminal. In some examples, the image data is one or more divided images. In other examples, the image data is one image, for example, a raw polarized image of one wavelength band. In yet other examples, the image data is an output image (a stitched image). In addition, the unmanned aerial vehicle 51 receives instructions relating to flight from the control terminal using the communication unit 120.

The sensor unit 130 is a group of devices that acquire a state of the unmanned aerial vehicle 51, and may include, for example, an acceleration sensor, a gyro sensor, an ultrasonic sensor, a pneumatic sensor, an optical flow sensor, a laser range finder, or other suitable sensor. The sensor unit 130 can convert an acquired state of the unmanned aerial vehicle 51 into a predetermined signal, and provide the signal to the control unit 110 when necessary.

The position information acquisition unit 132 acquires information of a current position of the unmanned aerial vehicle 51 using, for example, the GPS, a vision sensor, or other suitable positioning unit. The position information acquisition unit 132 can provide the acquired information of the current position of the unmanned aerial vehicle 51 to the control unit 110 when necessary. The control unit 110 executes control of the flight of the unmanned aerial vehicle 51 based on the flight information received from the control terminal using the information of the current position of the unmanned aerial vehicle 51 acquired by the position information acquisition unit 132.

The sensor unit 130 detects an obstacle that may interfere with a flight at the time of the flight. As the sensor unit 130 detects an obstacle, the unmanned aerial vehicle 51 can provide information related to the detected obstacle to the control terminal.

The storage unit 140 stores a variety of information. Examples of the information stored in the storage unit 140 include the flight information of the unmanned aerial vehicle 51 transmitted from the control terminal, and image data from the vegetation inspection device 11. In some examples, the image data is one or more divided images. In other examples, the image data is one image, for example, a raw polarized image of one wavelength band. In yet other examples, the image data is an output image (a stitched image).

The battery 150 accumulates electric power for operating the unmanned aerial vehicle 51. The battery 150 may be a primary battery in which only discharging is possible or may be a secondary battery in which charging is also possible, but when the battery 150 is the secondary battery, for example, the battery 150 can be supplied with electric power from a charging station.

The unmanned aerial vehicle 51 according to an embodiment of the present disclosure may have the configuration illustrated in FIG. 19 and thus can perform an automatic flight based on the flight path included in the flight information transmitted from the control terminal and execute the imaging processes described herein.

The exemplary function configuration of the unmanned aerial vehicle 51 according to an embodiment of the present disclosure has been described above with reference to FIGS. 13 and 14.

Note that, the present technology may have several different applications other than as a vegetation inspection device. Indeed, the present technology is applicable to wide imaging ranges that require scanning and stitching of images. For example, one application of the present technology is factory automation when the object of interest requires more than one scan, and in particular, more than one robotic scan. Another application of the present technology is a microscope image analysis of mineral salts. Another application of the present technology is a measurement of stress strain (photo elasticity). Another application of the present technology is a fault detection of a transparent resin molded product. Another application of the present technology is detection of contaminants in glass. Yet another application of the present technology is a measurement of film thickness.

Note that, the present technology can have the following configurations.

(1)

A processing device comprising:
circuitry configured to
acquire a plurality of images captured in a time series by an image sensor, each of the plurality of images is based on light in one of a plurality of predetermined polarization directions and in one of a plurality of predetermined wavelength bands; and
stitch together at least a part of the plurality of images corresponding to a single polarization direction and a single predetermined wavelength band from the plurality of predetermined wavelength bands to generate a composite image.

(2)

The processing device according to (1), wherein
the circuitry is further configured to
stitch together the plurality of images to generate a plurality of composite images including the composite image, each of the plurality of composite images corresponding to the one of the plurality of predetermined polarization directions and the one of the plurality of predetermined wavelength bands, and
generate a final output image from the plurality of composite images.

(3)

The processing device according to (1), wherein
the circuitry is further configured to
stitch together the plurality of images to generate a first plurality of composite images including the composite image, each of the first plurality of composite images corresponding to the one of the plurality of predetermined polarization directions and the one of the plurality of predetermined wavelength bands,
stitch together the first plurality of composite images to generate a second plurality of composite images, each of the second plurality of composite images corresponding to the one of the plurality of predetermined wavelength bands, and
generate a final output image from the second plurality of composite images.

(4)

The processing device according to (1), further comprising:
a polarization parameter extraction circuitry configured to extract a polarization parameter indicating a polarization state of the light on a surface of an inspection object from one or more images of the plurality of images; and
a specular reflection component removing circuitry configured to remove a specular reflection component on the surface of the inspection object from the one or more images of the plurality of images on a basis of the polarization parameter.

(5)

The processing device according to (4), wherein
the plurality of images is acquired from sensor elements that are adjacently arranged together, a number of the sensor elements corresponds to a number of the plurality of predetermined polarization directions, and the polarization parameter extraction circuitry is further configured to extract the polarization parameter on a basis of an output difference between the sensor elements.

(6)

The processing device according to (4), further comprising:

a polarization parameter feature point detection circuitry configured to detect a feature point from the one or more images of the plurality of images, wherein, to stitch together at least the part of the plurality of images corresponding to the single polarization direction and the single predetermined wavelength band from the plurality of predetermined wavelength bands to generate the composite image, the circuitry is further configured to stitch at least the part of the plurality of images on a basis of the feature point.

(7)

The processing device according to (6), further comprising:

a division circuitry configured to divide the plurality of images into pluralities of divided images, each plurality of divided images is based at least in part on one of the plurality of predetermined wavelength bands.

(8)

The processing device according to (7), wherein the polarization parameter extraction circuitry is further configured to control the division circuitry to divide the plurality of images into the pluralities of divided images in response to extracting the polarization parameter.

(9)

The processing device according to (7), wherein the division circuitry is further configured to control the polarization parameter extraction circuitry to extract the polarization parameter in response to dividing the plurality of images into the pluralities of divided images.

(10)

The processing device according to (7), further comprising:

an analysis circuitry configured to analyze the plurality of images; and a processing selection circuitry configured to select between a first processing of the plurality of images and a second processing of the plurality of images based on an analysis result of the analysis circuitry.

(11)

The processing device according to (10), wherein, to analyze the plurality of images, the analysis circuitry is configured to acquire a histogram of pixel values included in one image of the plurality of images that is acquired, determine a number of pixel values in the one image that are smaller than a specific reference value, determine whether the number of pixel values in the one image that are smaller than the specific reference value exceeds a threshold value, responsive to determining that the number of pixel values exceeds the threshold value, the processing selection circuitry is configured to select the first processing of the plurality of images, and responsive to determining that the number of pixel values does not exceed the threshold value, the processing selection circuitry is configured to select the second processing of the plurality of images.

(12)

The processing device according to (10), wherein, in the first processing of the plurality of images, the division circuitry divides the one or more images of the plurality of images into the pluralities of divided images.

(13)

The processing device according to (10), wherein, in the second processing of the plurality of images, the specular reflection component removing circuitry removes the specular reflection component from the one or more images of the plurality of images on a basis of the polarization parameter extracted by the polarization parameter extraction circuitry.

(14)

A method comprising:

acquiring, with a circuitry, a plurality of images captured in a time series by an image sensor, each of the plurality of images is based on light in one of a plurality of predetermined polarization directions and in one of a plurality of predetermined wavelength bands; and stitching together, with the circuitry, at least a part of the plurality of images corresponding to a single polarization direction and a single predetermined wavelength band from the plurality of predetermined wavelength bands to generate a composite image.

(15)

A non-transitory computer-readable medium storing a program for causing an electronic processor to execute a set of operations, the set of operations comprising:

acquiring a plurality of images captured in a time series by an image sensor, each of the plurality of images is based on light in one of a plurality of predetermined polarization directions and in one of a plurality of predetermined wavelength bands; and stitching together at least a part of the plurality of images corresponding to a single polarization direction and a single predetermined wavelength band from the plurality of predetermined wavelength bands to generate a composite image.

Furthermore, the present technology can also have the following configurations.

(1)

A signal processing device includes: a feature point detection unit configured to detect a feature point from an image included in each detection area, on the basis of output of a detection unit including the plurality of detection areas for wavelength bands, the detection areas each including a plurality of sensor elements that detects light in the same wavelength band and includes adjacent sensor elements that mutually detect the light in different polarization directions; and an image processing unit configured to stitch the image in each of the detection areas on the basis of the feature point that has been detected, so as to construct an image larger than one image acquired by the detection unit.

(2)

The signal processing device described in (1) above, further includes: a polarization parameter extraction unit configured to extract a polarization parameter indicating a polarization state of the light on a surface of an object to be inspected being an inspection object; and a specular reflection component removing unit configured to remove a specular reflection component on the surface of the object to be inspected from the image, on the basis of the polarization parameter.

(3)

According to the signal processing device described in (2) above, the sensor elements are adjacently arranged for each set including a number corresponding to the number of the polarization directions, and the polarization parameter extraction unit extracts the polarization parameter on the basis of an output difference between the sensor elements corresponding to the different polarization directions in the sensor elements in one set.

(4)

The signal processing device described in (2) above, further includes: a polarization parameter feature point detection unit configured to detect a feature point from the image including the polarization parameter extracted by the polarization parameter extraction unit, mapped. The image processing unit stitches the image in each of the detection areas on the basis of the feature point detected by the polarization parameter feature point detection unit.

(5)

The signal processing device described in any of (1) to (4) above, further includes: a division unit configured to divide the image for each of the detection areas.

(6)

According to the signal processing device described in (5) above, the polarization parameter extraction unit extracts the polarization parameter and then the division unit performs the division to each of the detection areas.

(7)

According to the signal processing device described in (5) above, the division unit divides the image for each of the detection areas and then the polarization parameter extraction unit performs the extraction of the polarization parameter.

(8)

The signal processing device described in (5) above, further includes: an analysis unit configured to perform analysis to the image; and a processing selection unit configured to select any one of first processing of performing the division to each of the detection areas by the division unit after the polarization parameter extraction unit extracts the polarization parameter and second processing of performing the extraction of the polarization parameter by the polarization parameter extraction unit after the division unit divides the image for each of the detection areas, in accordance with an analysis result of the analysis unit.

(9)

According to the signal processing device described in (6) above, the analysis unit acquires a histogram of pixel values included in the one image that is acquired, so as to acquire the number of the pixel values smaller than a specific reference value for each detection area as the analysis result. The processing selection unit selects the first processing in a case where the number of the pixel values smaller than the specific reference value is a threshold value or more in all the detection areas, and selects the second processing in a case where the number of the pixel values smaller than the specific reference value is less than the threshold value in any of the detection areas.

(10)

According to the signal processing device described in (8) or (9) above, the division unit divides the image including the specular reflection component removed by the specular reflection component removing unit on the basis of the polarization parameter extracted by the polarization parameter extraction unit, in the first processing.

(11)

According to the signal processing device described in (8) or (9) above, the specular reflection component removing unit removes the specular reflection component from the image divided by the division unit, on the basis of the polarization parameter extracted by the polarization parameter extraction unit from the image divided by the division unit, in the second processing.

(12)

A signal processing method includes: detecting a feature point from an image included in each detection area on the basis of output of a detection unit including the plurality of detection areas for wavelength bands, the detection areas each including a plurality of sensor elements that detects light in the same wavelength band and includes adjacent sensor elements that mutually detect the light in different polarization directions; and stitching the image in each of the detection areas on the basis of the feature point that has been detected, so as to construct an image larger than one image acquired by the detection unit.

(13)

A program for causing a computer to execute signal processing including: detecting a feature point from an image included in each detection area on the basis of output of a detection unit including the plurality of detection areas for wavelength bands, the detection areas each including a plurality of sensor elements that detects light in the same wavelength band and includes adjacent sensor elements that mutually detect the light in different polarization directions; and stitching the image in each of the detection areas on the basis of the feature point that has been detected, so as to construct an image larger than one image acquired by the detection unit.

(14)

An inspection device includes: a plurality of detection areas for wavelength bands, the detection areas each including a plurality of sensor elements that are arranged in a matrix form and detects light in the same wavelength. The plurality of sensor elements includes adjacent sensor elements that mutually detect the light in different polarization directions and is arranged for each set including the number of the polarization directions.

(15)

According to the inspection device described in (14) above, the detection areas are formed to have an elongate and rectangular shape in a first direction, and the detection areas of all the wavelength bands detected by a detection device are arranged at one or more places when viewed in a second direction orthogonal to the first direction.

(16)

According to the inspection device described in (14) or (15) above, the second direction is a moving direction in which relative movement is performed to an object to be inspected being an inspection object.

(17)

According to the inspection device described in any of (14) to (16) above, the detection areas of all the wavelength bands detected by the detection device are arranged at one or more places when viewed in a row direction and in a column direction.

(18)

According to the inspection device described in any of (14) to (17) above, the detection areas including at least 16 units of the sensor elements including four arranged in the row direction and four arranged in column direction, are individually minimum detection areas for the wavelength bands.

(19)

According to the inspection device described in any of (14) to (18) above, the sensor elements detect the light in three or more polarization directions.

(20)

According to the inspection device described in any of (14) to (19) above, the detection areas individually detect the light in a red wavelength band, the light in a green wavelength band, the light in a blue wavelength band, and the light in a near-infrared wavelength band.

(21)

The inspection device described in any of (14) to (20) above, further includes: a detection area configured to detect non-polarized light in all the wavelength bands.

(22)

The inspection device described in any of (14) to (21) above, further includes: a detection area including a sensor element that detects the non-polarized light in the red wavelength band, a sensor element that detects the non-polarized light in the green wavelength band, and a sensor element that detects the non-polarized light in the blue wavelength band, arranged in a Bayer array.

(23)

According to the inspection device described in any of (14) to (22) above, four units of the sensor elements that detect the light in four polarization directions are included in one set, and the sensor elements are arranged in a 4×4 matrix.

(24)

The inspection device described in any of (14) to (23), further includes: a signal processing unit configured to perform signal processing of generating an image having a range wider than a size in one time of detection, on the basis of detection values detected by the sensor elements.

(25)

A signal processing method includes: detecting a feature point from an image included in each detection area on the basis of output of a detection unit including the plurality of detection areas for wavelength bands, the detection areas each including a plurality of sensor elements including adjacent sensor elements that mutually detect light in different polarization directions, the detection areas each configured to detect the light in the same wavelength band; and stitching the image in each of the detection areas on the basis of the feature point that has been detected, so as to construct an image larger than one image acquired by the detection unit.

(26)

A program for causing a computer to execute signal processing including: detecting a feature point from an image included in each detection area on the basis of output of a detection unit including a plurality of detection areas for wavelength bands, the detection areas each including a plurality of sensor elements including adjacent sensor elements that mutually detect light in different polarization directions, the detection areas each configured to detect the light in the same wavelength band; and stitching the image in each of the detection areas on the basis of the feature point that has been detected, so as to construct an image larger than one image acquired by the detection unit.

Note that, the present embodiment is not limited to the above embodiments, and thus various alterations may be made without departing from the spirit of the present disclosure.

REFERENCE SIGNS LIST

11 Vegetation inspection device
12 Detection device
13 Signal processing device
21 Image data analysis unit
22 Image processing selection unit
23a First image processing unit
23b Second image processing unit
24 Stitching processing unit
31a and 31b Polarization parameter extraction unit
32a and 32b Specular reflection component removing unit
33a and 33b Image division unit
34a and 34b First feature point detection unit
35a and 35b Second feature point detection unit
36a Second image division unit
51 Unmanned aerial vehicle
104a, 104b, 104c, and 104d Rotor
108a, 108b, 108c, and 108d Motor
110 Control unit
120 Communication unit
130 Sensor unit
132 Position information acquisition unit
140 Storage unit
150 Battery

The invention claimed is:

1. A processing device comprising:
circuitry configured to
acquire a plurality of images captured in a time series by an image sensor, each of the plurality of images is based on light in one of a plurality of predetermined polarization directions and in one of a plurality of predetermined wavelength bands,
stitch together at least a part of the plurality of images corresponding to a single polarization direction and a single predetermined wavelength band from the plurality of predetermined wavelength bands to generate a composite image,
stitch together the plurality of images to generate a first plurality of composite images including the composite image, each of the first plurality of composite images corresponding to the one of the plurality of predetermined polarization directions and the one of the plurality of predetermined wavelength bands,
stitch together the first plurality of composite images to generate a second plurality of composite images, each of the second plurality of composite images corresponding to the one of the plurality of predetermined wavelength bands, and
generate a final output image from the second plurality of composite images.

2. The processing device according to claim 1, wherein the circuitry is further configured to
stitch together the plurality of images to generate a third plurality of composite images including the composite image, each of the third plurality of composite images corresponding to the one of the plurality of predetermined polarization directions and the one of the plurality of predetermined wavelength bands, and
generate a second final output image from the third plurality of composite images.

3. A processing device comprising:
circuitry configured to
acquire a plurality of images captured in a time series by an image sensor, each of the plurality of images is based on light in one of a plurality of predetermined polarization directions and in one of a plurality of predetermined wavelength bands,
stitch together at least a part of the plurality of images corresponding to a single polarization direction and a single predetermined wavelength band from the plurality of predetermined wavelength bands to generate a composite image;

a polarization parameter extraction circuitry configured to extract a polarization parameter indicating a polarization state of the light on a surface of an inspection object from one or more images of the plurality of images; and a specular reflection component removing circuitry configured to remove a specular reflection component on the surface of the inspection object from the one or more images of the plurality of images on a basis of the polarization parameter.

4. The processing device according to claim 3, wherein the plurality of images is acquired from sensor elements that are adjacently arranged together, a number of the sensor elements corresponds to a number of the plurality of predetermined polarization directions, and the polarization parameter extraction circuitry is further configured to extract the polarization parameter on a basis of an output difference between the sensor elements.

5. The processing device according to claim 3, further comprising:

a polarization parameter feature point detection circuitry configured to detect a feature point from the one or more images of the plurality of images, wherein, to stitch together at least the part of the plurality of images corresponding to the single polarization direction and the single predetermined wavelength band from the plurality of predetermined wavelength bands to generate the composite image, the circuitry is further configured to stitch at least the part of the plurality of images on a basis of the feature point.

6. The processing device according to claim 5, further comprising:

a division circuitry configured to divide the plurality of images into pluralities of divided images, each plurality of divided images is based at least in part on one of the plurality of predetermined wavelength bands.

7. The processing device according to claim 6, wherein the polarization parameter extraction circuitry is further configured to control the division circuitry to divide the plurality of images into the pluralities of divided images in response to extracting the polarization parameter.

8. The processing device according to claim 6, wherein the division circuitry is further configured to control the polarization parameter extraction circuitry to extract the polarization parameter in response to dividing the plurality of images into the pluralities of divided images.

9. The processing device according to claim 6, further comprising:

an analysis circuitry configured to analyze the plurality of images; and a processing selection circuitry configured to select between a first processing of the plurality of images and a second processing of the plurality of images based on an analysis result of the analysis circuitry.

10. The processing device according to claim 9, wherein, to analyze the plurality of images, the analysis circuitry is configured to acquire a histogram of pixel values included in one image of the plurality of images that is acquired, determine a number of pixel values in the one image that are smaller than a specific reference value, determine whether the number of pixel values in the one image that are smaller than the specific reference value exceeds a threshold value, responsive to determining that the number of pixel values exceeds the threshold value, the processing selection circuitry is configured to select the first processing of the plurality of images, and responsive to determining that the number of pixel values does not exceed the threshold value, the processing selection circuitry is configured to select the second processing of the plurality of images.

11. The processing device according to claim 9, wherein, in the first processing of the plurality of images, the division circuitry divides the one or more images of the plurality of images into the pluralities of divided images.

12. The processing device according to claim 9, wherein, in the second processing of the plurality of images, the specular reflection component removing circuitry removes the specular reflection component from the one or more images of the plurality of images on a basis of the polarization parameter extracted by the polarization parameter extraction circuitry.

13. A method comprising:

acquiring, with a circuitry, a plurality of images captured in a time series by an image sensor, each of the plurality of images is based on light in one of a plurality of predetermined polarization directions and in one of a plurality of predetermined wavelength bands;

stitching together, with the circuitry, at least a part of the plurality of images corresponding to a single polarization direction and a single predetermined wavelength band from the plurality of predetermined wavelength bands to generate a composite image;

stitching together, with the circuitry, the plurality of images to generate a first plurality of composite images including the composite image, each of the first plurality of composite images corresponding to the one of the plurality of predetermined polarization directions and the one of the plurality of predetermined wavelength bands, stitching together, with the circuitry, the first plurality of composite images to generate a second plurality of composite images, each of the second plurality of composite images corresponding to the one of the plurality of predetermined wavelength bands; and generating, with the circuitry, a final output image from the second plurality of composite images.

14. A non-transitory computer-readable medium storing a program for causing an electronic processor to execute a set of operations, the set of operations comprising:

acquiring a plurality of images captured in a time series by an image sensor, each of the plurality of images is based on light in one of a plurality of predetermined polarization directions and in one of a plurality of predetermined wavelength bands;

stitching together at least a part of the plurality of images corresponding to a single polarization direction and a single predetermined wavelength band from the plurality of predetermined wavelength bands to generate a composite image;

stitching together the plurality of images to generate a first plurality of composite images including the composite image, each of the first plurality of composite images corresponding to the one of the plurality of predetermined polarization directions and the one of the plurality of predetermined wavelength bands, stitching together the first plurality of composite images to generate a second plurality of composite images, each of the second plurality of composite images corresponding to the one of the plurality of predetermined wavelength bands; and generating a final output image from the second plurality of composite images.

15. A non-transitory computer-readable medium storing a program for causing an electronic processor to execute a set of operations, the set of operations comprising:

acquiring a plurality of images captured in a time series by an image sensor, each of the plurality of images is based on light in one of a plurality of predetermined polarization directions and in one of a plurality of predetermined wavelength bands;

stitching together at least a part of the plurality of images corresponding to a single polarization direction and a single predetermined wavelength band from the plurality of predetermined wavelength bands to generate a composite image;

extracting a polarization parameter indicating a polarization state of the light on a surface of an inspection object from one or more images of the plurality of images; and removing a specular reflection component on the surface of the inspection object from the one or more images of the plurality of images on a basis of the polarization parameter.

16. A method comprising:

acquiring, with a circuitry, a plurality of images captured in a time series by an image sensor, each of the plurality of images is based on light in one of a plurality of predetermined polarization directions and in one of a plurality of predetermined wavelength bands;

stitching together, with the circuitry, at least a part of the plurality of images corresponding to a single polarization direction and a single predetermined wavelength band from the plurality of predetermined wavelength bands to generate a composite image;

extracting, with a polarization parameter extraction circuitry, a polarization parameter indicating a polarization state of the light on a surface of an inspection object from one or more images of the plurality of images; and removing, with a specular reflection component removing circuitry, a specular reflection component on the surface of the inspection object from the one or more images of the plurality of images on a basis of the polarization parameter.

17. The method according to claim 16, further comprising:

detecting, with a polarization parameter feature point detection circuitry, a feature point from the one or more images of the plurality of images, wherein stitching together at least the part of the plurality of images corresponding to the single polarization direction and the single predetermined wavelength band from the plurality of predetermined wavelength bands to generate the composite image further includes stitching at least the part of the plurality of images on a basis of the feature point.

18. The method according to claim 17, further comprising:

dividing, with a division circuitry, the plurality of images into pluralities of divided images, each plurality of divided images is based at least in part on one of the plurality of predetermined wavelength bands.

19. The method according to claim 18, further comprising:

analyzing, with an analysis circuitry, the plurality of images; and selecting, with a processing selection circuitry, a first processing of the plurality of images or a second processing of the plurality of images based on an analysis result of the analysis circuitry.

20. The method according to claim 19, wherein analyzing, with the analysis circuitry, the plurality of images further includes acquiring a histogram of pixel values included in one image of the plurality of images that is acquired, determining a number of pixel values in the one image that are smaller than a specific reference value, determining whether the number of pixel values in the one image that are smaller than the specific reference value exceeds a threshold value, responsive to determining that the number of pixel values exceeds the threshold value, selecting the first processing of the plurality of images, and responsive to determining that the number of pixel values does not exceed the threshold value, selecting the second processing of the plurality of images.

* * * * *